US012761074B2

(12) United States Patent
Nick et al.

(10) Patent No.: US 12,761,074 B2
(45) Date of Patent: Oct. 13, 2026

(54) SPATIOTEMPORAL OPTICAL SIGNAL REPEATER

(71) Applicant: Microsoft Technology Licensing, LLC, Redmond, WA (US)

(72) Inventors: Teresa A. Nick, Towson, MD (US); Timothy Andrew Large, Bellevue, WA (US); Shashank Gupta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/918,889

(22) Filed: Oct. 17, 2024

(65) Prior Publication Data

US 2026/0110573 A1 Apr. 23, 2026

(51) Int. Cl.
*G01J 1/04* (2006.01)

(52) U.S. Cl.
CPC .................................. *G01J 1/0425* (2013.01)

(58) Field of Classification Search
CPC ...... G01J 1/0425; G02F 1/365; G02F 1/3551; G02F 1/3528
See application file for complete search history.

(56) References Cited

U.S. PATENT DOCUMENTS 6,686,588 B1 * 2/2004 Webster ................ H10F 39/804 250/239
2003/0170028 A1 * 9/2003 Mori .................... H04B 10/506 398/79

OTHER PUBLICATIONS

International Search Report and Written Opinion received for PCT Application No. PCT/US2025/039976, Mailed on Dec. 5, 2025, 15 Pages.
Karbasi, et al., “Image Transport Through a Disordered Optical Fiber Mediated by Transverse Anderson Localization”, In Journal of Nature communications, vol. 5, Issue No. 1, Feb. 25, 2014, 9 Pages.
Karbasi, et al., “Multiple-Beam Propagation in an Anderson Localized Optical Fiber”, In Journal of Department of Electrical Engineering and Computer Science, vol. 21, Issue No. 1, Jan. 4, 2013, 12 Pages.
Mafi, et al., “Transverse Anderson Localization and Image Transport Through Disordered Fibers”, In Journal of Active Photonic Materials VII, vol. 9546, Aug. 31, 2015, 6 Pages.

* cited by examiner

*Primary Examiner* — Georgia Y Epps
*Assistant Examiner* — Don J Williams
(74) *Attorney, Agent, or Firm* — Ray Quinney & Nebeker P.C.; Paul N. Taylor

(57) ABSTRACT

An optical repeater for communicating optical signals between a transmission device and a reception device through an optical transmission medium includes an optical receiver and an optical transmitter each positioned on a transmission path of the optical signals. The optical receiver is configured to detect an input spatiotemporal pattern transmitted from the transmission device, and the optical transmitter is configured to transmit an output spatiotemporal pattern to the reception device, the output spatiotemporal pattern being based at least in part on the input spatiotemporal pattern.

20 Claims, 13 Drawing Sheets

SPATIOTEMPORAL OPTICAL SIGNAL REPEATER

BACKGROUND OF THE DISCLOSURE

High performance computing tasks, such as machine learning model training and utilization, include multiple computers performing different tasks and communicating with one another. Latency in data communication within a computing location, such as a server room, server rack, co-location or datacenter can be a limiting factor on processing speeds. Robust optical communication can transmit data efficiently and reliably in a computing system.

SUMMARY

In some embodiments, an optical repeater for communicating optical signals between a transmission device and a reception device through an optical transmission medium includes an optical receiver and an optical transmitter each positioned on a transmission path of the optical signals. The optical receiver is configured to detect an input spatiotemporal pattern transmitted from the transmission device, and the optical transmitter is configured to transmit an output spatiotemporal pattern to the reception device, the output spatiotemporal pattern being based at least in part on the input spatiotemporal pattern.

In some embodiments, an optical communication system includes an optical transmission medium for transmitting optical signals from a transmission device through a first portion of the optical transmission medium to a reception device through a second portion of the optical transmission medium, and an optical repeater positioned on a transmission path of the optical signals between the first portion and the second portion of the optical transmission medium. The optical repeater includes an optical receiver coupled to the first portion and configured to detect an input spatiotemporal pattern transmitted from the transmission device, and an optical transmitter coupled to the second portion and configured to transmit an output spatiotemporal pattern to the reception device. The optical repeater further includes a repeater circuit electronically connecting the optical receiver and the optical transmitter and configured to generate the output spatiotemporal pattern based at least in part on the input spatiotemporal pattern.

In some embodiments, a method of communicating spatiotemporal patterns includes detecting, with a plurality of light receptors of an optical receiver, an input spatiotemporal pattern transmitted from a transmission device through an optical transmission medium. The method includes driving a plurality of light emitters of an optical transmitter based at least in part on the detected input spatiotemporal pattern to generate an output spatiotemporal pattern. The method further includes transmitting the output spatiotemporal pattern from the optical transmitter to a reception device through the optical transmission medium.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 1-2 and 1-3 illustrate various features of an optical repeater, according to embodiments of the present disclosure;

FIG. 1-4 is a circuit diagram of an embodiment of a repeater circuit, according to at least one embodiment of the present disclosure;

FIGS. 2-1 and 2-2 illustrate one or more examples of an optical repeater for receiving and transmitting spatiotemporal patterns, according to at least one embodiment of the present disclosure;

FIG. 3 illustrates an example of an optical repeater for receiving and transmitting spatiotemporal patterns, according to at least one embodiment of the present disclosure;

FIG. 4 illustrates an example of an optical repeater for receiving and transmitting spatiotemporal patterns, according to at least one embodiment of the present disclosure;

DETAILED DESCRIPTION

The present disclosure relates generally to devices, systems, and methods for communicating data between computing devices. More particularly, the present disclosure relates to communicating, between computing devices, data encoded into optical signals comprising spatiotemporal patterns. In some embodiments, an optical repeater device is positioned optically between a transmission device and a reception device to communicate data therebetween. For instance, an optical repeater may be positioned between lengths of an optical fiber to relay (e.g., and in some cases transform) optical signals transmitted as spatiotemporal patterns from a transmission device to a reception device. For example, in some embodiments, the optical repeater is configured and positioned to repeat, amplify, modify, transform, fan out, fan in, redirect, scale, or remap (and combinations thereof) the spatiotemporal pattern(s) received from the transmission device and broadcast to the reception device.

In a conventional computing system using optical communications, optical communication may typically take place by transmitting optical signals through optical transmission media such as optical fibers, waveguides formed in optically transparent materials (e.g., glass), etc. In many cases, optical signals may attenuate or lose signal strength as the signal travels through the optical transmission medium. This may lead to optical signals becoming distorted, lost, or otherwise unreliable.

In some embodiments, an optical repeater may be implemented for repeating, regenerating, and/or relaying optical signals along an optical transmission medium, for example, in order that the optical signals may be transmitted over longer distances while minimizing losses to signal reliability. For instance, an optical repeater may receive an input spatiotemporal pattern from a transmission device and may emit an output spatiotemporal pattern to a reception device that is the same as, or based at least partially on, the input spatiotemporal pattern. In some embodiments, the output spatiotemporal pattern is substantially the same as the input spatiotemporal pattern. For example, the optical repeater may receive an input spatiotemporal pattern as transmitted by a transmission device and emit an output spatiotemporal pattern to a reception device as though the reception device received the original input spatiotemporal pattern. In some embodiments, the output spatiotemporal pattern is different from the input spatiotemporal pattern. For example, the output spatiotemporal pattern may have additional information encoded in the output spatiotemporal pattern. In another example, the output spatiotemporal pattern may be based on two or more input spatiotemporal patterns. In another example, the output spatiotemporal pattern may be transformed, remapped, modified, or operated on in one or more manners as described herein.

Figure 1:
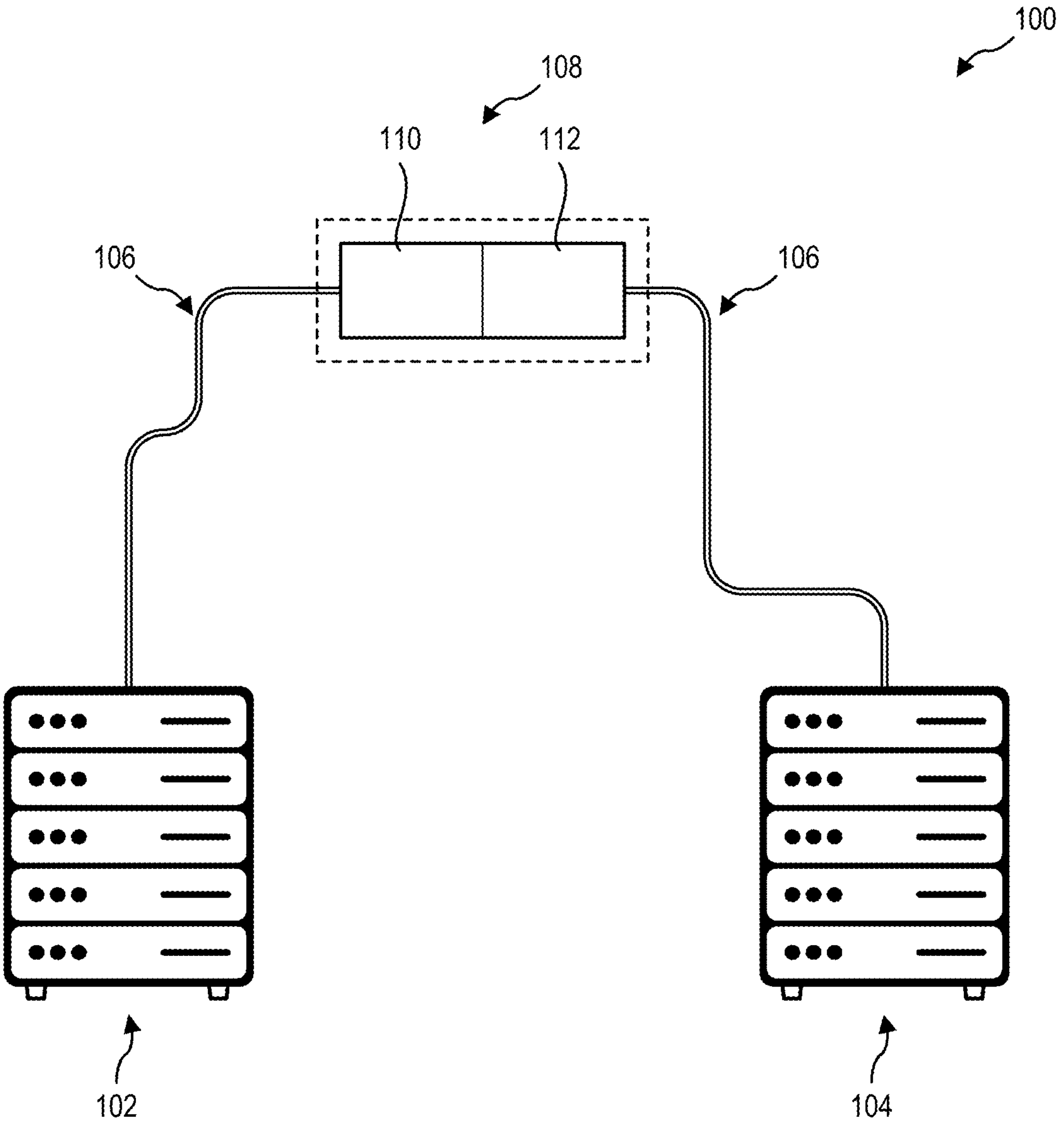
FIG. 1-1 illustrates an example of a computing system, according to at least one embodiment of the present disclosure.
Figures 1, 2:
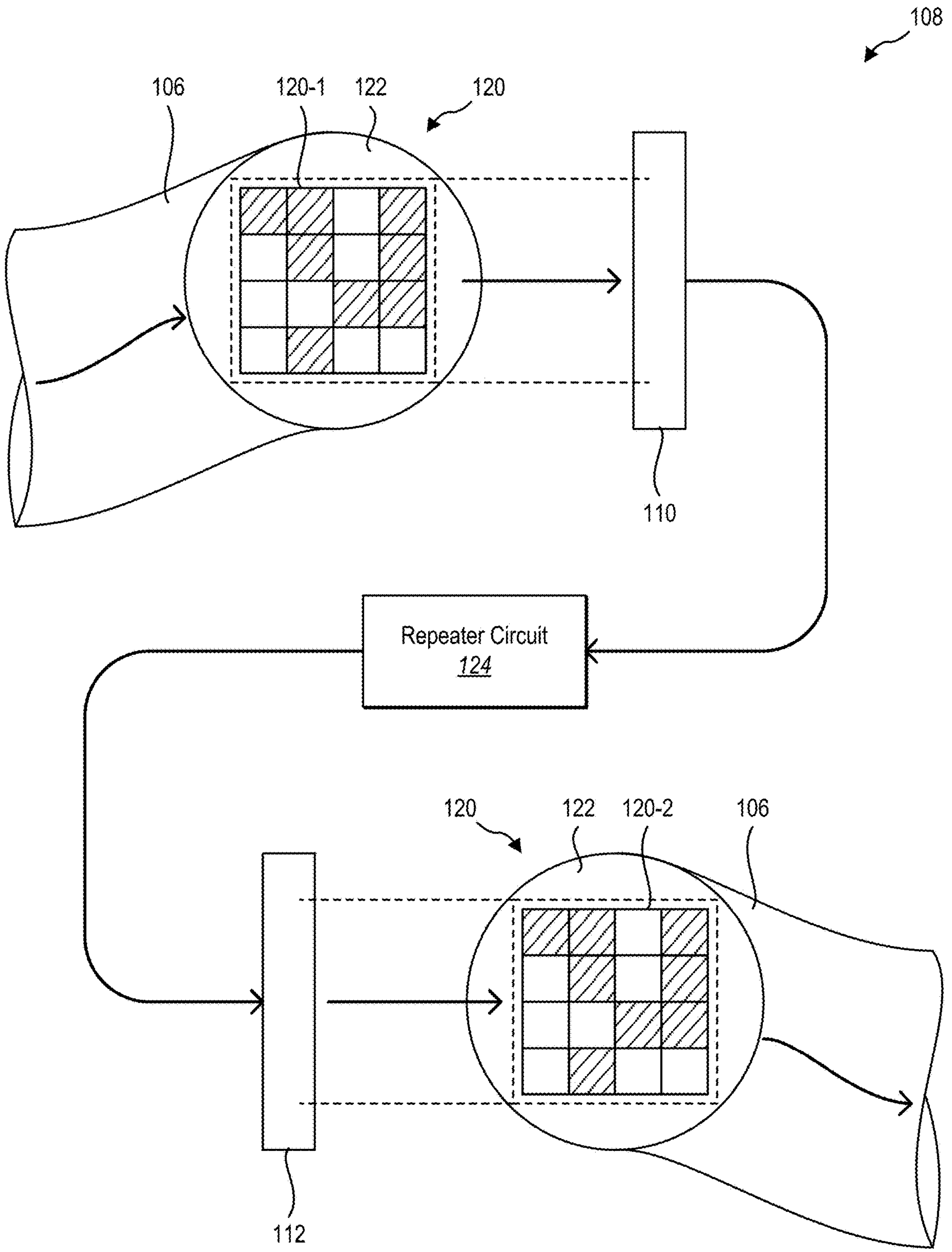
Figures 1, 2, 3:
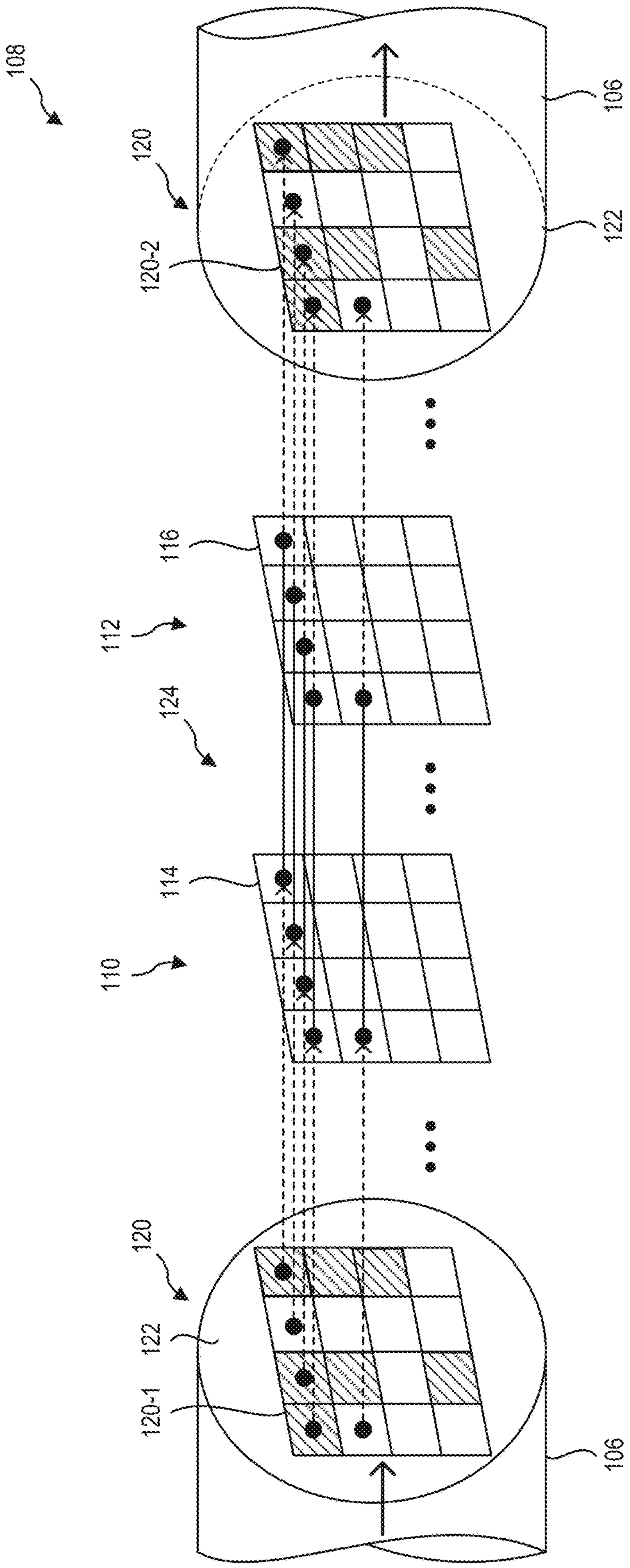

FIG. 1-1 illustrates an example of a computing system 100, according to at least one embodiment of the present disclosure. The computing system 100 may be an optical computing system in that devices in the computing system may communicate optically based on sending and receiving optical signals. For instance, the computing system includes a transmission device 102 and a reception device 104 connected via an optical fiber 106. While the transmission device 102 and the reception device 104 imply optical data communication in a certain direction (e.g., from transmission device 102 to reception device 104), it should be understood that in some cases data transmission may occur in any direction, including multiple directions. The computing system 100 includes an optical repeater 108 for repeating, relaying, and in some cases transforming optical signals along the optical fiber 106. FIGS. 1-2 and 1-3 illustrate various features of the optical repeater 108, according to embodiments of the present disclosure.

The transmission device 102 and the reception device 104 are connected through an optical transmission medium represented as the optical fiber 106. The present disclosure in not limited to just implementations with an optical fiber 106, however. For example, as used herein, an optical fiber should be understood to be representative of any optical transmission medium. For example, an optical transmission medium may be any optical transmission medium suitable for transmitting localized optical signals as described herein. For instance, the optical transmission medium may be an optical fiber, a bundle of several optical fibers, an optically transparent medium (e.g., glass), a waveguide formed (e.g., etched) in an optically transparent medium, a free space transmission path of optical signals, any other optical transmission medium, and any combination thereof. As discussed herein, in some cases the optical fiber 106 may specifically be a Transverse Anderson Localization Optical Fiber (TALOF).

Conventionally, optical communication may generally be limited to transmitting signals as modulations encoded into an optical carrier signal. For example, by causing modulations or pulses to a laser carrier signal, data units (e.g., bits) can be encoded into an optical signal and transmitted through an optical fiber to be received at a receiving device. These techniques may even be implemented by modulating and/or multiplexing several carrier signals (e.g., of different colors or wavelengths) through a single optical fiber. Notably, however, these conventional optical communication techniques rely on the serial transmission of bits via a carrier signal (or sometimes multiple carrier signals), and may also involve the optical signal being transmitted and/or received through substantially all of the cross section of the optical fiber. For example, optical communications generally do not discriminate optical signals within an optical fiber based on a spatial location of the optical signal within the cross-section of the optical fiber.

In some embodiments, however, optical signals containing multiple data units (e.g., multiple bits, trits, etc.) may be transmitted in parallel through a transmission medium by leveraging wave localization within the transmission medium. To elaborate, the present disclosure relates to techniques for encoding and transmitting multiple pieces of information optically, for example through an optical fiber, and may be based on a phenomenon where disorder in a medium causes light waves to become trapped or confined to specific regions within the medium. The transverse disorder in the refractive index profile of the medium induces this localization, allowing light to be confined to spatial regions or modes, which may be discrete and/or non-overlapping, minimizing the spread of the optical signal across the medium's cross-section. Transverse Anderson Localization (TAL) is a known example of this localization phenomenon, which may be leveraged by the techniques described herein to optically communicate patterns of multiple data units at once.

As mentioned, in some cases the optical fiber 106 may specifically be a TALOF. For example, TALOFs may be specially engineered optical fibers (or other media) that exhibit disorder necessary for facilitating the localization phenomena described herein. For instance, in many cases, single mode or even multimode optical fibers are not compatible for localized optical communications, based on these fibers having properties (e.g., index profiles) that are designed to guide light uniformly without the disorder needed for localization. TALOFs, in contrast, may have a deliberately disordered structure randomly distributed across the transverse plane to induce the localization of light. For instance, TALOFs may have a randomized transverse refractive index profile (e.g., perpendicular to the direction of light propagation), which may be introduced by creating random variations in the core material, embedding random air holes, incorporating disordered inclusions in the fiber structure, etc.

Through leveraging TAL, or other similar phenomenon, for transmitting localized optical signals, multiple pieces of information may be transmitted in parallel through an optical medium and the information may be effectively isolated to different localized "channels" within the medium. This phenomenon may be leveraged for encoding digital information into a multi-data-unit analog signal which may be transmitted optically from one device to another. For example, as shown in FIGS. 1-2 and 1-3, spatiotemporal patterns 120 may be transmitted through the optical fiber 106. For instance, a spatiotemporal pattern may be an array, grid, matrix, pattern, image or other structured scheme having multiple cells (e.g., pixels) which may be transmitted together through an optical fiber for communicating multiple or many different pieces of information at a time, in contrast to, for example, modulating a light signal to convey information one bit at a time (e.g., in serial) and throughout the cross section of the fiber. In some examples, various information may be encoded via index locations of cells (e.g., pixels) of the spatiotemporal patterns 120 through the use of different colors (e.g., wavelengths), light intensities, modulations, or any of a variety of other conceivable encoding schemes. Thus, in place of encoding, modulating, and transmitting a single carrier signal of light, a pattern of light signals having both spatial and temporal properties (e.g., spatiotemporal pattern 120) may be generated at a transmission device, transmitted through an optical medium, and received by a reception device with the same spatial and temporal properties or pattern (e.g., and in some cases with transformations having been performed thereon as described herein). For example, the spatiotemporal pattern 120 may be an image transmitted through an optical fiber. The spatiotemporal patterns 120 are discussed in more detail below in connection with FIG. 7.

Signal transmission in this way may provide numerous benefits for transmitting data between devices. For example, by transmitting multiple data units in parallel via a spatiotemporal pattern of multiple cells, optical data transmission can be achieved at considerable bandwidths. For example, bandwidth may in affect be based on the size and/or dimensions of the spatiotemporal pattern dictating the quantity of data units that may be transmitted at a time. Thus, bandwidth improvements over conventional, serial optical transmission techniques may be increased by several times, exponentially, or even by orders of magnitude based on communicating with spatiotemporal patterns having numerous cells (e.g., pixels) for communicating numerous data units. Further, in some cases multiple data streams may be communicated at once through different regions of the spatiotemporal pattern, such as through different subsets of pixels of a pattern. In this way, TAL signal transmission, or a similar approach, may provide significant improvements for optical communication between devices.

One challenge with this approach, however, is that the wave localization phenomenon is often observed only over relatively short transmission lengths. For example, while light may be confined to specific regions due to the disorder in the transverse plane of the medium, the distance over which the light remains trapped in these localized modes is typically finite. Beyond this localization length, the light modes may start to spread and leak out of their confined regions, leading to a degradation of the localization effect. Accordingly, localized optical signal transmission based on leveraging TAL may be challenging over long distances, as the localized modes (e.g., signal channels) may begin to bleed into one another, overlap, scatter, degrade, exhibit noise, crosstalk, or exhibit other undesirable outcomes. Thus, in order to maintain a high degree of resolution, fidelity, and/or reliability of signals, in some cases transmission lengths for localized optical signals may be limited to several meters. For example, in some cases the localization effect of confined waves in an optical fiber may begin to decay, may become lost, or may otherwise become unreliable over lengths greater than 3 meters, 5 meters, or 10 meters. In some cases, where spatiotemporal patterns of the localized optical signals have a high resolution and/or many cells (e.g., pixels), such as those transmitting a high quantity of information, transmission lengths may be even shorter. The opposite may be true for transmissions of lower resolution spatiotemporal patterns, resulting in longer transmission lengths.

As mentioned, the computing system 100 includes an optical repeater 108. The optical repeater 108 may be implemented in connection with TAL communications (or other similar localized optical communications) in order to detect and relay spatiotemporal optical signals. The optical repeater 108 in this way may facilitate increasing transmission lengths, redirecting signals, performing transformations or operations on the optical signals, etc., as described herein.

For example, the optical repeater 108 may include an optical receiver 110 and an optical transmitter 112. As shown in FIG. 1-2, the optical receiver 110 may detect or receive an input spatiotemporal pattern 120-1 from the transmission device 102. Based on the optical receiver 110 detecting the input spatiotemporal pattern 120-1, the optical transmitter 112 and may emit an output spatiotemporal pattern 120-2 to the reception device 104. The output spatiotemporal pattern 120-2 may be the same as, or based at least partially on, the input spatiotemporal pattern 120-1. In some embodiments, the output spatiotemporal pattern 120-2 is substantially the same as the input spatiotemporal pattern 120-1. For example, the optical repeater 108 may facilitate transmitting an output spatiotemporal pattern 120-2 to the reception device 104 as if the reception device 104 was receiving the original input spatiotemporal pattern 120-1 transmitted from the transmission device 102.

In some embodiments as described herein, the output spatiotemporal pattern 120-2 is different from the input spatiotemporal pattern 120-1. For example, the optical repeater 108 may facilitate performing one or more transformations of the input spatiotemporal pattern 120-1 to generate an output spatiotemporal pattern 120-2 that is different than the input spatiotemporal pattern 120-1 in one or more respects, such as having additional information encoded in the output spatiotemporal pattern 120-2. In another example, the output spatiotemporal pattern 120-2 may be based on two or more input spatiotemporal patterns. In another example, the input spatiotemporal pattern 120-1 may be transformed, remapped, modified, or operated on in one or more manners as described herein.

In some embodiments, the optical receiver 110 includes one or more optical sensors or light receptors for detecting or receiving the input spatiotemporal pattern 120-1. For example, the optical receiver 110 may include image sensors, photodiodes, light-sensitive photodetectors, optical transducers, or any other type of optical or photo-sensitive sensor. For example, the optical receiver 110 may include one or more CMOS optical sensors.

The optical receiver 110 may be coupled to the optical fiber 106. For example, the optical receiver 110 may be abutted, butt coupled, or otherwise joined to an optical face 122 of the optical fiber 106. In this way, the light signals that are transmitted and/or emitted from the optical fiber 106 may be directed at and/or detected by the optical receiver 110. For example, the optical receiver 110 may be positioned normal or perpendicular to the longitudinal axis of the optical fiber 106.

In some embodiments, one or more components may be positioned on, around, or near the coupling of the optical fiber 106 to the optical receiver 110. For example, a heat sink or other cooling device may be implemented at or near the coupling of the optical receiver 110 for providing cooling to the optical receiver 110 and/or other related electronics. For example, a heat sink, such as an optically transparent medium with micro fluid channels, may be positioned between the optical fiber 106 and the optical receiver 110 for providing cooling to the optical receiver 110 via a coolant flowing through the channels.

As shown in FIG. 1-3. The optical receiver 110 may include a light receptor array 114 including a plurality of light receptors. The light receptors of the light receptor array 114 may all be the same type of light receptor or may include multiple different types of light receptors. The light receptor array 114 may be configured to detect and/or measure input light to the light receptor array 114. For example, the light receptors of the light receptor array 114 may be configured and arranged in an array, matrix, pattern, or other spatial configuration such that certain light receptors (or groups of receptors) of the light receptor array 114 correspond positionally with specific cells or index locations of the input spatiotemporal pattern 120-1. For instance, the light receptor array 114 may be configured with a same, similar, or complimentary shape, pattern, matrix, dimensions, or form of the input spatiotemporal pattern 120-1. The various locations of the light receptor array 114 may be configured to detect and/or discern a specific localized light channel of the input spatiotemporal pattern 120-1, and in this way, each of the cells comprising the input spatiotemporal pattern 120-1 may be detected by the light receptor array 114 of the optical receiver 110.

In some embodiments, one or more of the light receptors of the light receptor array 114 may be a 2-state light receptor. For example, the light receptor(s) may be configured to detect an "on" state and an "off" state of an optical signal of a given cell (or group of cells) of the input spatiotemporal pattern 120-1. In some embodiments, one or more of the light receptors may be a 3-state (or more) light receptor. For example, the light receptor(s) may be configured to detect an "on state" for two different colors or wavelengths of light, as well as an "off" state. In some embodiments, one or more of the light receptors may be a continuously variable light receptor configured to detect light of any number of different colors on a spectrum. In some embodiments, one or more light receptors may be configured to detect different light intensities at one or more cells of the input spatiotemporal pattern 120-1. In some embodiments, one or more light receptors may be configured to detect ultraviolet light, infrared light, and/or any other electromagnetic signal suitable for transmission through the optical fiber 106.

In some embodiments, each light receptor and/or each cell or index location of the light receptor array 114 may comprise one or multiple light receptor components. For example, a light receptor at a given location in the light receptor array 114 may include multiple light detecting components, for example, for detecting multiple different colors of light, for detecting visible and near visible light, for detecting light of different intensities etc. In this way, each light receptor may be comprised of one or multiple components, but may be conceptually considered a single light receptor.

In some embodiments, the light receptor array 114 includes one or more light filters to selectively detect a color or channel of light. For example, the light receptor array 114 may include one or more filters at one or more (or each) light receptor to discern between different color channels of input light and/or to isolate different cells or index locations of the input spatiotemporal pattern 120-1.

As described herein, the input spatiotemporal patterns 120-1 may communicate information based on presenting certain colors and/or light intensities at the various cells. The light receptor array 114 may be configured to detect one or multiple color channels (e.g., wavelengths) at each cell, and/or one or multiple light intensities at each cell, including detecting no or limited input light at a cell the input spatiotemporal pattern 120-1 (i.e., an "off" state in the input spatiotemporal pattern 120-1). As used herein, light (e.g., emitting and/or detecting light) may refer to visible light, or any other electromagnetic signal that may be transmitted through an optical transmission medium as described herein. For example, the spatiotemporal patterns may be comprised of different cells presented as one or more of visible light (e.g., about 400 to about 700 nanometers), near-visible infrared light (e.g., about 780 nanometers to about 1 millimeter), near-visible ultraviolet light (e.g., about 100 nanometers to about 400 nanometers), or any other suitable electromagnetic signal, and combinations thereof.

Based on the optical receiver 110 detecting the input spatiotemporal pattern 120-1, the optical repeater 108 may drive the optical transmitter 112 to generate and/or emit the output spatiotemporal pattern 120-2. In some embodiments, the optical transmitter 112 includes one or more optical emitters or light emitters. For example, the optical transmitter may include one or more light emitting diodes (LEDs), micro-LEDs, organic light emitting diodes (OLEDs), lasers, projectors, or any other suitable emitter for generating, emitting, projecting, or transmitting light. For example, the optical transmitter 112 may be a micro-LED display for presenting and/or emitting the output spatiotemporal pattern 120-2 across a plurality of micro-LED pixels (e.g., each comprising one or more diode) of the micro-LED display.

The optical transmitter 112 may be coupled to the optical fiber 106. For example, the optical transmitter 112 may be abutted, butt coupled, or otherwise joined to an optical face 122 of the optical fiber 106. In this way, the light that is emitted from the (e.g., pixels of the) optical transmitter may be transmitted into and through the optical fiber 106. For example, the optical transmitter 112 may be positioned normal or perpendicular to the longitudinal axis of the optical fiber 106 in order that light emitted from the optical transmitter 112 may travel longitudinally through the optical fiber 106.

In some embodiments, one or more components may be positioned on, around, or near the coupling of the optical fiber 106 to the optical transmitter 112. For example, a heat sink or other cooling device may be implemented at or near the coupling of the optical transmitter 112 for providing cooling to the optical transmitter 112 and/or other related electronics. For example, a heat sink, such as an optically transparent medium with micro fluid channels, may be positioned between the optical fiber 106 and the optical transmitter 112 for providing cooling to the optical transmitter 112 via a coolant fluid flowing through the channels.

As shown in FIG. 1-3, the optical transmitter 112 may include a light emitter array 116 including a plurality of light emitters. The light emitters of the light emitter array 116 may all be the same type of light emitter, or may include multiple different types of light emitters. The light emitter array 116 may be configured to emit and/or generate output light for transmitting the output spatiotemporal pattern 120-2 through the optical fiber 106. For example, the light emitters of the light emitter array 116 may be configured and arranged in an array, matrix, pattern or other spatial configuration such that certain light emitters (or groups of emitters) of the light emitter array 116 correspond positionally with specific cells or index locations of the output spatiotemporal pattern 120-2 (e.g., an in some cases of the input spatiotemporal pattern 120-1). For instance, the light emitter array 116 may be configured with a same, similar, or complimentary shape, pattern, matrix, dimensions, or form of the output spatiotemporal pattern 120-2. The various emitters positionally located within the light emitter array 116 may be configured and positioned to emit and/or generate a specific localized light channel or cell of the output spatiotemporal pattern 120-2, and in this way, each of the cells comprising the output spatiotemporal pattern 120-2 may be produced by the light emitter array 116 of the optical transmitter 112.

In some embodiments, the light emitter array 116 is configured with the same shape, pattern, and/or configuration as the light receptor array 114. For example, the light emitter array 116 may have a quantity and distribution of light emitters that is the same as the quantity and distribution of the light receptors of the light receptor array 114. In some embodiments, the light emitter array 116 is configured with a different shape, pattern, quantity of light emitters, and/or configuration than the light receptors of the light receptor array 114. For example, the light emitter array 116 may be configured to generate and transmit the output spatiotemporal pattern 120-2 having a different size, shape, orientation, and/or quantity of cells than that of the input spatiotemporal pattern 120-1.

One or more of the light emitters of the light emitter array 116 may be a 2-state light source. For example, the light emitter(s) may have two states, such as "on" and "off." In some embodiments, one or more of the light emitters may be a 3-state (or more) light source. For example, the light emitter(s) may selectively emit two different colors in an "on" state and may also have an "off" state. In some embodiments, one or more of the light emitters may be a continuously variable light source that may emit any number of colors. For example, one or more light emitters may include two or more different diodes capable of emitting different colors (e.g., red and/or green and/or blue) to produce continuously variable sets of colors on a spectrum. In some embodiments, one or more emitters includes an emitter capable of producing ultraviolet light, infrared light, and/or any other electromagnetic signal suitable for transmission through the optical fiber 106. In some cases, one or more light emitters may be configured to emit light at two or more different light intensities. Any of the light emitters and/or features of the light emitters as described herein may be combined such that one or more light emitters may exhibit multiple of these properties. For example, one or more light emitters may be configured to emit two or more colors of light at two or more different light intensities. In some embodiments, the emitters of the light emitter array 116 are each the same type of emitter and/or each are similarly configured. In some embodiments, on or more light emitters of the light emitter array 116 may be configured differently.

In some embodiments, each light emitter and/or each cell or index location of the light emitter array 116 may comprise one or multiple light emitter components. For example, a light emitter at a given location in the light emitter array 116 may include multiple light generating components, for example, for emitting multiple different colors of light, for emitting near visible and visible light, for emitting light of different intensity etc. In this way, each light emitter may be comprised of one or multiple components, but may be conceptually considered a single light emitter.

As mentioned above, the optical transmitter 112 may transmit the output spatiotemporal pattern 120-2 based on the optical receiver 110 detecting the input spatiotemporal pattern 120-1. For example, optical receiver 110 and the optical transmitter 112 may be in electrical communication through electronic circuitry represented as a repeater circuit 124. The repeater circuit 124 may receive electrical signals from the optical receiver 110 and may drive the optical transmitter 112 based at least partially on the received electrical signals.

In a particular example, such as that shown in FIG. 1-3, the light receptors of the light receptor array 114 may receive or detect the input spatiotemporal pattern 120-1 and may generate and/or may be excited to output electrical signals corresponding to the properties of the light signals they detected. The repeater circuit 124 may receive these electrical signals and may transmit and/or direct the electrical signals to corresponding light emitters of the light emitter array 116. In some embodiments, the repeater circuit 124 may amplify, tune, filter, and/or transform the electrical signals. Accordingly, the light emitters of the light emitter array 116 may be driven to emit light such that the output spatiotemporal pattern 120-2 is transmitted through the optical fiber 106. In some embodiments, the light emitters may emit light as the output spatiotemporal pattern 120-2 that is substantially the same as the light signals received by the light receptors as the input spatiotemporal pattern 120-1. For example, in some embodiments, the light receptors of the light receptor array 114 may be mapped to the light emitters of the light emitter array 116 at the cell locations such that the output spatiotemporal pattern 120-2 is the same as the input spatiotemporal pattern 120-1. In this way, the optical repeater 108 may be implemented to relay or repeat a spatiotemporal pattern along the optical fiber 106 such that it may be received further down the optical fiber 106 substantially as it was originally transmitted. In some embodiments, as described herein, the light receptor array 114 and the light emitter array 116 may be otherwise mapped and/or the repeater circuit 124 may be otherwise configured to perform one or more operations or transformations on the input spatiotemporal pattern 120-1 to generate an output spatiotemporal pattern 120-2 that is different from the input spatiotemporal pattern 120-1.

In some embodiments, the repeater circuit 124 may be an analog circuit. For example, the repeater circuit 124 may include circuitry that is wholly analog such that the electrical signals transmitted through the repeater circuit 124 (e.g., from the optical receiver 110 to the optical transmitter 112) are transmitted wholly in the analog domain, for example, without being translated, transposed, or otherwise converted to digital information. For instance, the repeater circuit 124 may not include any processing components such a central processing unit (CPU), graphical processing unit (GPU), neural unit (NU), or other processing or software component.

The repeater circuit 124 may include one or more non-processing components. For instance, the repeater circuit 124 may include passive analog components such as resistors, capacitors, inductors, diodes, power supplies, and/or other analog components. The repeater circuit 124 may include one or more active analog components such as transistors, operational amplifiers, voltage regulators, and/or other analog components. The repeater circuit 124 may include any other electrical component. In this way, the repeater circuit 124 may be configured in an analog manner to receive electrical signals from the optical receiver 110 and provide the electrical signals to the optical transmitter 112 in order to drive the optical transmitter 112 to emit the output spatiotemporal pattern 120-2, including (in some cases)

amplifying, filtering, or otherwise modifying the electrical signals as needed to accomplish this outcome.

The repeater circuit 124 being analog in this way may facilitate the optical repeater 108 operating with a reduced latency and/or with a low power consumption. For example, by not relying on processing components to perform operations, the repeater circuit 124 may operate at higher speeds so as to not overly degrade the latency advantages of optical data transmission. Additionally, analog circuitry in this way may be more reliable, robust, and/or have a longer operational life than processing components. Further, the optical repeater 108 operating based on analog components may require a substantially lower power draw as opposed to relying on software and/or processing components to process the electronic and/or optical signals.

As described herein, the repeater circuit 124 may be configured to transform and/or perform one or more logical operations on the input spatiotemporal pattern 120-1. In some embodiments, such a transformation logic circuit may be implemented wholly through analog components, such as by hardcoding logic with hardware of the circuit to perform the one or more transformations. For instance, such hardware-based coding may be implemented via a field programmable gate array (FPGA) or an application-specific integrated circuit (ASIC). In some cases, one or more of these implementations may include processing components and/or components that may not be considered wholly analog. For instance, in the case of an FPGA, the processing components may be implemented for a configuration step or process in order to configure the FPGA with the appropriate hard-coded hardware, and it should be understood that the implementation of the repeater circuit 124 on an FPGA in this way is implemented as an analog circuit in operation.

In some embodiments, the repeater circuit 124 includes one or more processing components and/or non-analog components. For example, the repeater circuit 124 may implement processing components to detect and/or interpret the input spatiotemporal pattern 120-1, perform operations on the input spatiotemporal pattern 120-1, generate the output spatiotemporal pattern 120-2, drive the optical transmitter 112, or any other function, for example, by executing software.

In some embodiments, two or more of the optical receiver 110, the optical transmitter 112, and the repeater circuit 124 may be implemented on a same printed circuit board (PCB). For instance, the optical receiver 110 and the optical transmitter 112 may be positioned on the same PCB in an adjacent or non-adjacent orientation. In one particular example, the optical receiver 110 and the optical transmitter 112 may be positioned on opposite sides (e.g., front and back) of the PCB. This may facilitate implementing the optical repeater 108 for transmitting spatiotemporal patterns along the optical fiber 106 in a longitudinal and/or colinear manner. For instance, the optical repeater 108 may be implemented to extend the length of an optical fiber 106 in a same direction and/or in a coaxial manner. In some embodiments, the optical receiver 110 and the optical transmitter 112 may be positioned on different PCBs, for example, to facilitate connecting a first optical fiber and a second optical fiber in different directions and/or orientations as described herein. The optical receiver 110 and the optical transmitter 112 may be connected via the repeater circuit 124 and by one or more PCBs in any other manner.

FIG. 1-4 is a circuit diagram of an embodiment of the repeater circuit 124, according to at least one embodiment of the present disclosure. In some embodiments, the repeater circuit 124 includes one or more photoresistors 126. For instance, the photoresistors 126 may be the light receptors of the light receptor array 114. In some embodiments, the photoresistors 126 may include one or more wavelength filters 128 to selectively detect a portion of the input light from the input spatiotemporal pattern 120-1. In some embodiments, the photoresistors 126 generate an electrical signal when exposed to light, and the electrical signal (through one or more resistors 130 and/or transistors 132) directs electrical current from a power supply 134 to an LED 136 or other light source.

The repeater circuit 124 as shown in FIG. 1-4 may be simplified and/or may be representative of one light receptor of the light receptor array 114 and one light emitter of the light emitter array 116, for example, mapped to each other. The repeater circuit 124 may be implemented with multiple or many instances of the (the same or similar) circuitry shown in FIG. 1-4, for example, to form the light receptor array 114 and the light emitter array 116 as described herein. In some embodiments, the repeater circuit 124 may include one or more additional components and/or one or more modifications to one or more components shown in FIG. 1-4, for example, for performing one or more transformations on the input spatiotemporal pattern 120-1 as described herein. In this way, the repeater circuit 124 may receive the input spatiotemporal pattern 120-1 with the optical receiver 110 and may emit the output spatiotemporal pattern 120-2 with the optical transmitter 112.

FIGS. 2-1 and 2-2 illustrate one or more examples of an optical repeater 208 for receiving and transmitting spatiotemporal patterns, according to one or more embodiments of the present disclosure. The optical repeater 208 includes an optical receiver 210 and an optical transmitter 212. The optical repeater 208 may be connected to an optical fiber 206, for example, at an intermediate portion along the optical fiber 206. The optical receiver 210 and the optical transmitter 212 may be electrically connected via a repeater circuit 224.

As described herein, the optical repeater 208 may facilitate repeating or relaying an optical signal comprising a spatiotemporal pattern along the optical fiber 206. For example, the optical receiver 210 may receive or detect an input spatiotemporal pattern 220-1 from a first portion 206-1 of the optical fiber. The first portion 206-1 may be connected to a transmission device such that the input spatiotemporal pattern 220-1 may be received by the optical receiver 210 as transmitted from the transmission device. Based on detecting the input spatiotemporal pattern 220-1, the optical receiver 210 may transmit one or more electrical signals via the repeater circuit 224 to the optical transmitter 212. Based on the electrical signals, the optical transmitter may be driven by the repeater circuit 224 to generate or emit an output spatiotemporal pattern 220-2, and may transmit the output spatiotemporal pattern 220-2 along a second portion 206-2 of the optical fiber 206. In some cases, the input spatiotemporal pattern 220-1 and the output spatiotemporal pattern 220-2 are the same spatiotemporal pattern. In this way, the optical repeater 208 may facilitate propagating the input spatiotemporal pattern 220-1 along the optical fiber 206, for example, to facilitate an increased transmission length of localized optical signal over the optical fiber 206. In some embodiments, the output spatiotemporal pattern 220-2 may be different from the input spatiotemporal pattern 220-1, as described herein, for example, based on a transformation of the input spatiotemporal pattern 220-1 by the repeater circuit 224.

As shown in FIG. 2-2, in some cases, the optical repeater 208 may facilitate repeating and/or relating spatiotemporal signals in one or more different directions. For example, the optical receiver 210 and the optical transmitter 212 may be positioned with respect to each other at a transmission angle 240. For instance, the optical receiver 210 and the optical transmitter 212 may be mounted to a (same or different) PCB at the transmission angle 240 to facilitate implementing a bend, angle, dogleg, etc., to the transmission path of optical data along the optical fiber 206. The transmission angle 240 may be any angle, such as from 0° to 360°. Additionally, while the transmission angle 240 is illustrated as being defined in only one plane or two dimensions, it should be understood that the transmission angle 240 may be an angle in 3-dimensions. This may facilitate implementing more complex and/or sophisticated geometries of runs of the optical fiber 206, for example, without overly bending, kinking, or exerting the optical fiber 206, which can tend to damage or break the optical fiber 206, negatively affect signal transmission along the optical fiber 206, etc. The optical repeater 208 exhibiting the transmission angle 240 may facilitate implementing the optical signal transmission techniques described herein over and/or through any transmission path, such as through various rooms, areas, runs, ducts, etc., of a datacenter.

FIG. 3 illustrates an example of an optical repeater 308 for receiving and transmitting spatiotemporal patterns, according to at least one embodiment of the present disclosure. The optical repeater 308 may include an optical receiver 310 for receiving an input spatiotemporal pattern 320-1 along an optical fiber 306. The optical repeater 308 may facilitate transforming or remapping the input spatiotemporal pattern 320-1 from a 2-dimensional form or domain to a 3-dimensional form or domain. For example, the optical receiver 310 may be coupled via a repeater circuit 324 to a 3-dimensional optical transmitter 312. The optical transmitter 312 may be coupled to a 3-dimensional transmission volume 342, and may emit or generate an output spatiotemporal pattern 320-2, which may be displayed as a pattern of cells structured and positionally ordered in 3-dimensional space. For example, a plurality of emitters may be 3-dimensionally disposed within the transmission volume 342, and the emitters may emit the various colors, intensities, etc. in space and time within the 3-dimensional transmission volume 342. The transmission volume 342 may be any 3-dimensional shape, such as a cube, a cylinder, a sphere, or any other shape or volume. Some or all of the output spatiotemporal pattern 320-2 may be viewed and/or interpreted by a reception device, for example, with one or more cameras, image sensors, or other light sensing devices positioned to view the output spatiotemporal pattern 320-2 at one or more angle through the transmission volume 342.

Figures 1, 2, 3, 4:
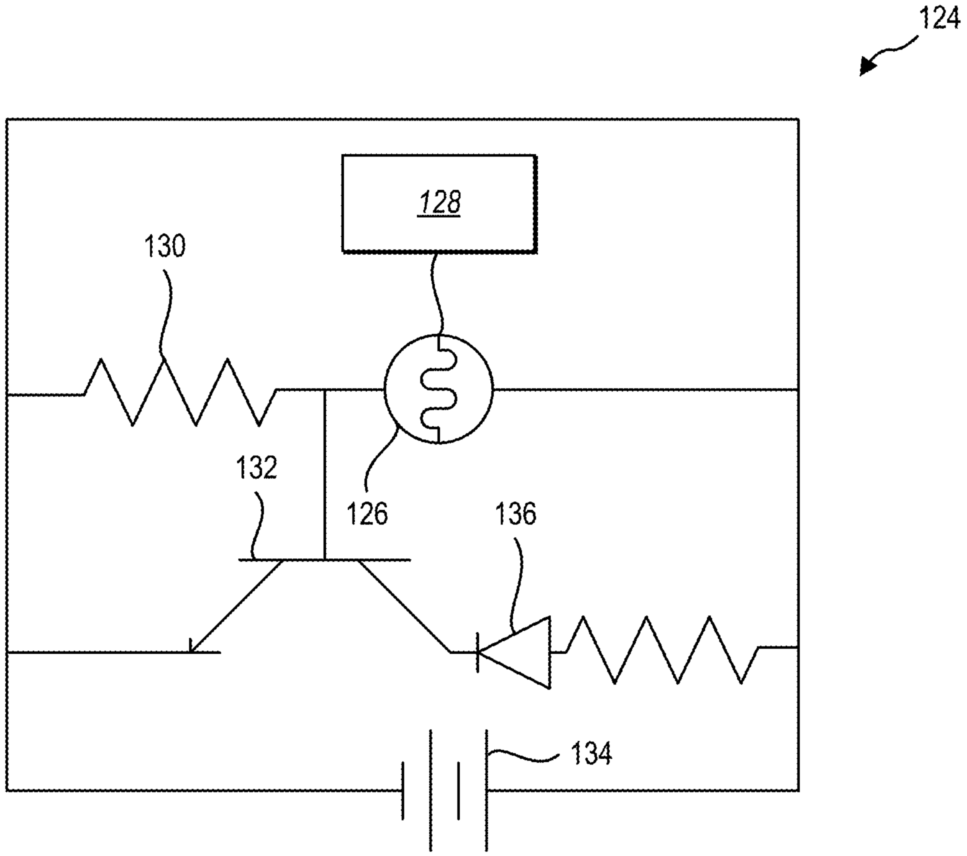
Figures 1, 2:
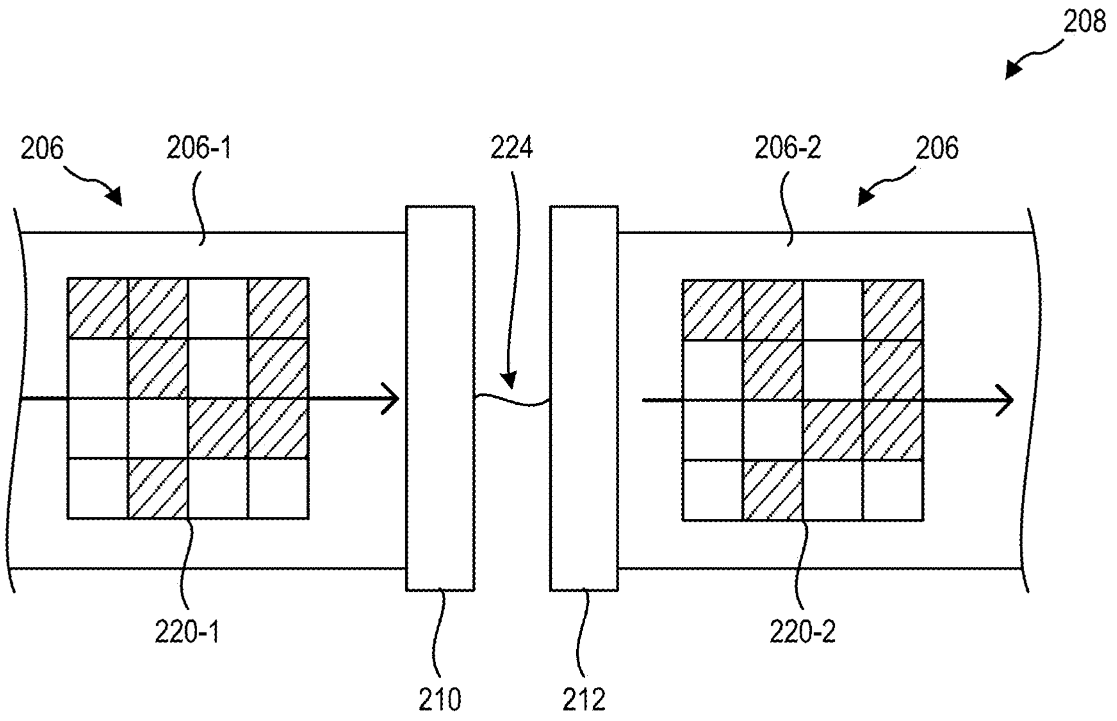
Figure 2:
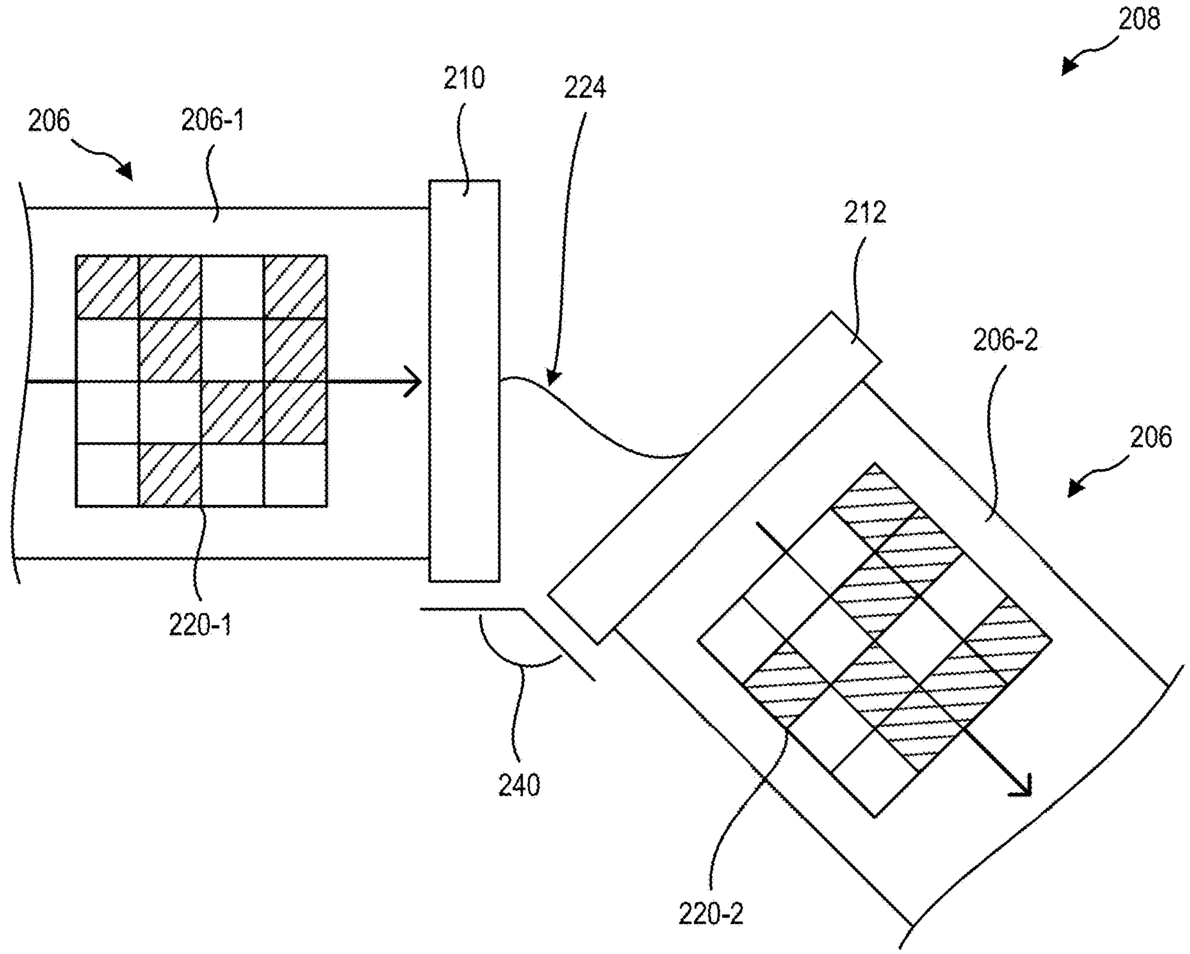
Figure 3:
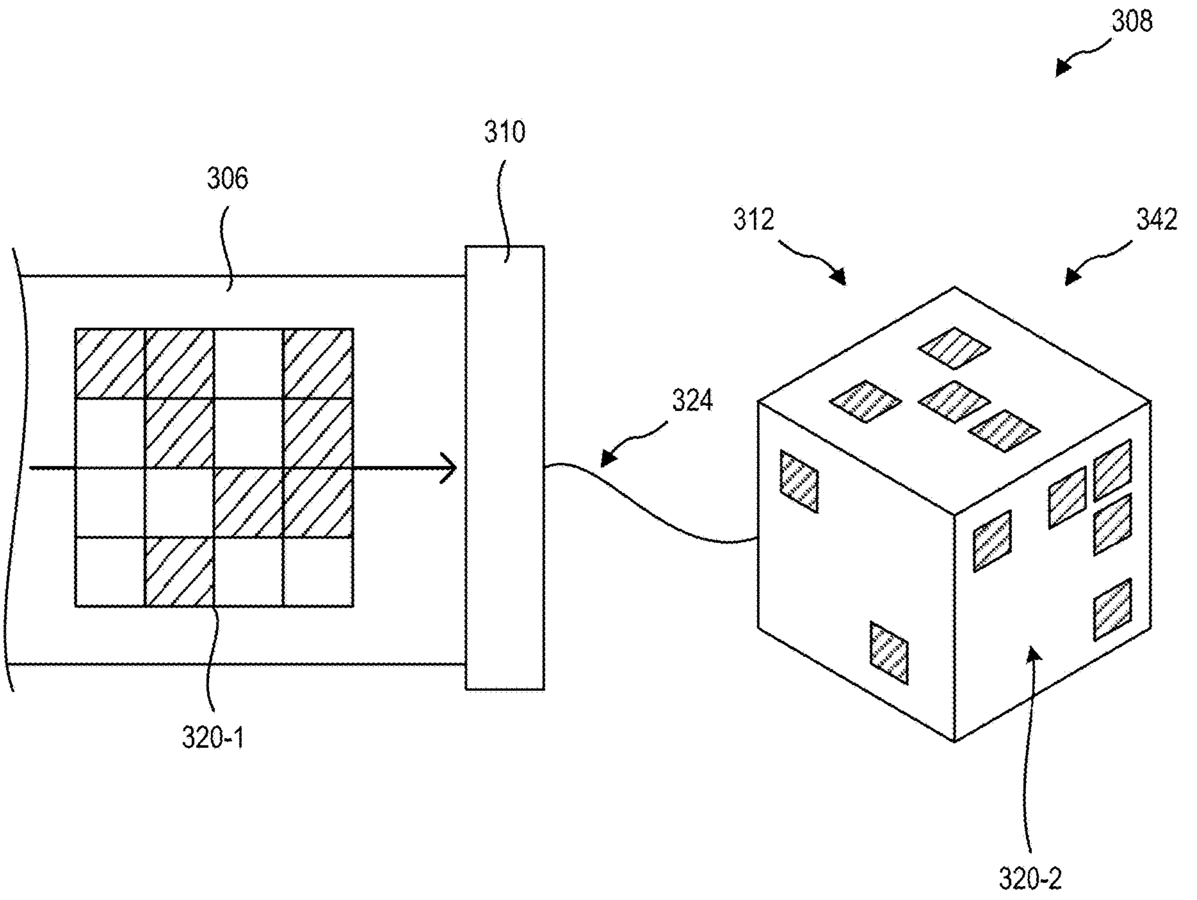
Figure 4:
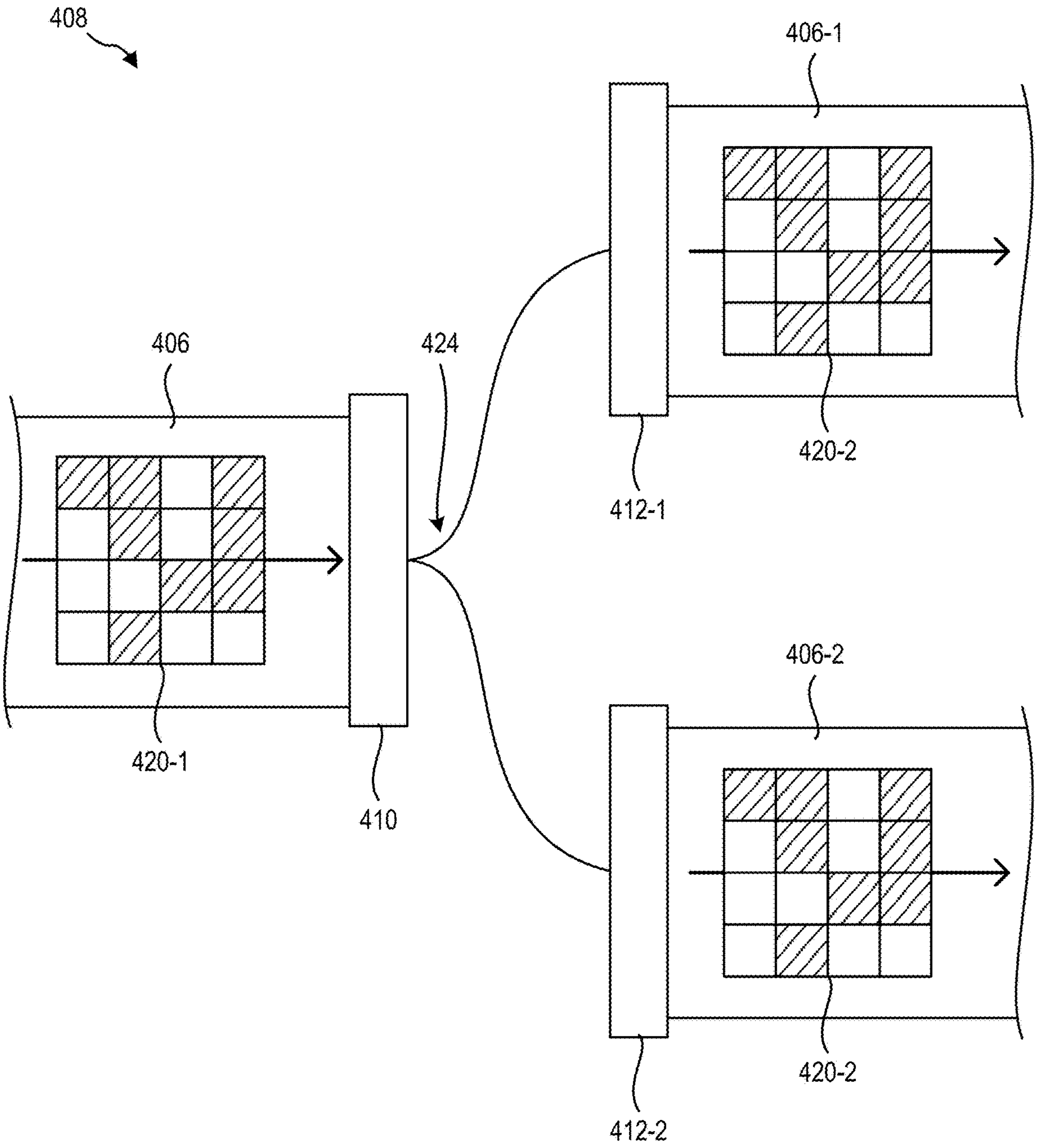

FIG. 4 illustrates an example of an optical repeater 408 for receiving and transmitting spatiotemporal patterns, according to at least one embodiment of the present disclosure. The optical repeater 408 includes an optical receiver 410 for receiving an input spatiotemporal pattern 420-1 along an optical fiber 406. The optical repeater 408 includes a first optical transmitter 412-1 and a second optical transmitter 412-2. The first optical transmitter 412-1 may be coupled to a first optical fiber 406-1 and the second optical transmitter 412-2 may be coupled to a second optical fiber 406-2. The first optical transmitter 412-1 and the second optical transmitter 412-2 may each be connected via a receiver circuit 424 to the optical receiver 410. The optical repeater 408 may be configured to generate and emit an output spatiotemporal pattern 420-2 at each of the first optical transmitter 412-1 and the second optical transmitter 412-2 for transmitting the output spatiotemporal pattern 420-2 through each of the first optical fiber 406-1 and the second optical fiber 406-2. The output spatiotemporal pattern 420-2 may be the same as the input spatiotemporal pattern 420-1 or may be different, as described herein. In this way, the optical repeater 408 may facilitate duplicating, fanning out, or otherwise transmitting multiple instances of the output spatiotemporal pattern 420-2 through multiple different optical fibers.

Figure 5:
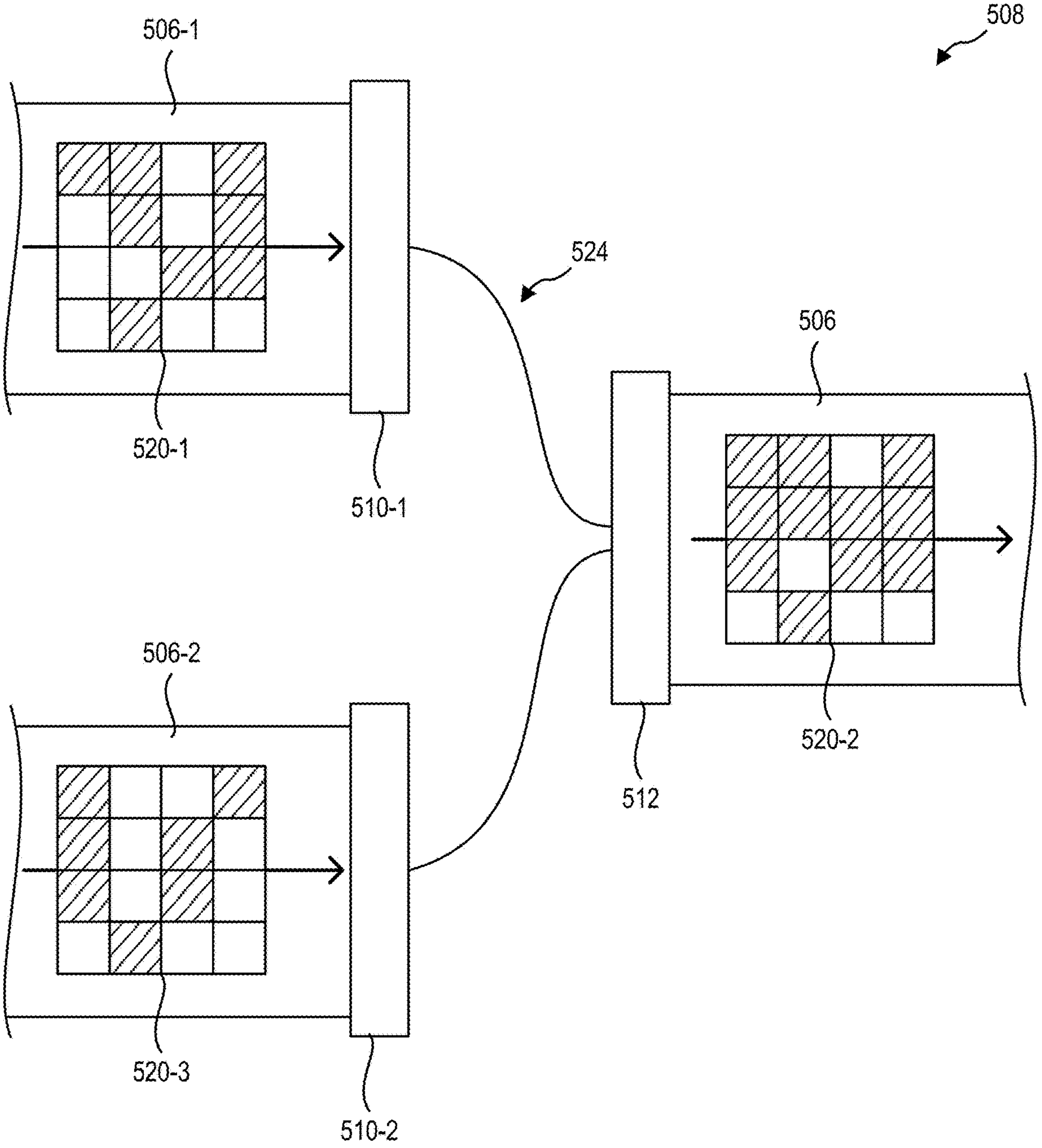
FIG. 5 illustrates an example of an optical repeater for receiving and transmitting spatiotemporal patterns, according to at least one embodiment of the present disclosure.

FIG. 5 illustrates an example of an optical repeater 508 for receiving and transmitting spatiotemporal patterns, according to at least one embodiment of the present disclosure. The optical repeater 508 includes an optical transmitter 512 for transmitting an output spatiotemporal pattern 520-2 along an optical fiber 506. The output spatiotemporal pattern 520-2 may be generated and emitted by the optical repeater 508 based on multiple input spatiotemporal patterns. For example, the optical repeater 508 includes a first optical receiver 510-1 and a second optical receiver 510-2. The first optical receiver 510-1 may be coupled to a first optical fiber 506-1 and the second optical receiver 510-2 may be coupled to a second optical fiber 506-2. The first optical receiver 510-1 and the second optical receiver 510-2 may each be connected via a repeater circuit 524 to the optical transmitter 512. The first optical receiver 510-1 may receive a first input spatiotemporal pattern 520-1 and the second optical receiver 510-2 may receive a second input spatiotemporal pattern 520-3. The first input spatiotemporal pattern 520-1 and the second input spatiotemporal pattern 520-3 may be different spatiotemporal patterns, and may communicate different underlying data sets. For example, the first input spatiotemporal pattern 520-1 may be transmitted from a first transmission device, and the second input spatiotemporal pattern 520-3 may be transmitted from a second transmission device.

The optical repeater 508 may facilitate generating the output spatiotemporal pattern 520-2 based on both the first input spatiotemporal pattern 520-1 and the second input spatiotemporal pattern 520-3. For example, the optical repeater 508 may combine the first input spatiotemporal pattern 520-1 and the second input spatiotemporal pattern 520-3 to generate the output spatiotemporal pattern 520-2 based on performing one or more operations on the first input spatiotemporal pattern 520-1 with the second input spatiotemporal pattern 520-3. For instance, the repeater circuit 524 may include hard coded logic for performing one or more operations or transformations, such as that described in connection with the transformation logic circuit of FIG. 6.

In accordance with at least one embodiment of the present disclosure, the optical repeater 508 may perform a sum or all-reduce operation on the first input spatiotemporal pattern 520-1 and the second input spatiotemporal pattern 520-3 For example, the repeater circuit 524 may be configured to sum the light properties (e.g., via analog and/or hardwired logic) at each cell of the first input spatiotemporal pattern 520-1 with the light properties at a corresponding cell of the second input spatiotemporal pattern 520-3. For instance, summing the light properties at a given cell may result in the corresponding cell of the output spatiotemporal pattern 520-2 having a different color or hue, having a different intensity, or other property. In this way, summation of spatiotemporal signals may be performed, automatically, innately, and/or through the properties of the optical signals themselves, for example, rather than being performed as a function or operation of a computing component. This may facilitate offloading one or more summation operations from the computational burden of a software application, such as a machine learning model, which may provide significant efficiency and latency benefits. In this way, the optical repeater 508 may be implemented to perform in-network computing operations or transformations based on multiple input spatiotemporal signals, for example, which may be performed by nature of only transmitting the respecting signals and without having to rely on any processing components for performing such operations. The optical repeater 508 may be configured to receive or fan in any number of input spatiotemporal patterns, such as 3, 4, 5, 6, 7, 8, 9, 10 or more input spatiotemporal patterns, and may sum (or perform another operation as described herein) the input spatiotemporal patterns to generate and transmit a resulting output spatiotemporal pattern 520-2.

Figure 6:
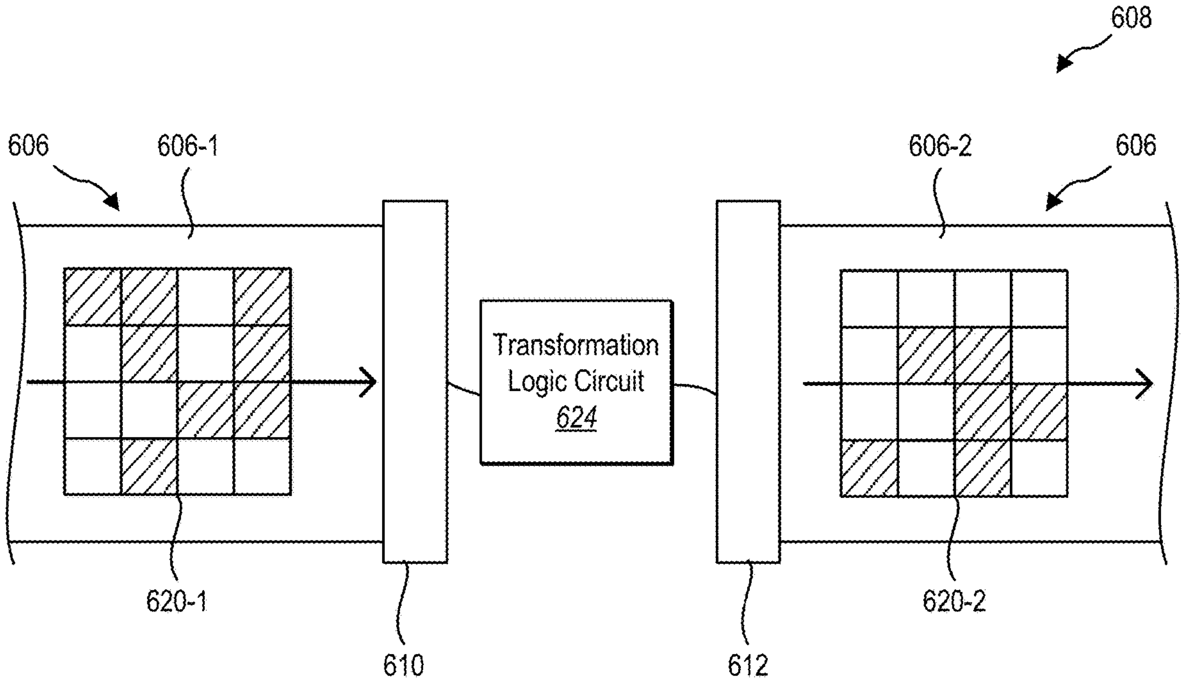
FIG. 6 illustrates an example of an optical repeater for receiving and transmitting spatiotemporal patterns, according to at least one embodiment of the present disclosure.

FIG. 6 illustrates an example of an optical repeater 608 for receiving and transmitting spatiotemporal patterns, according to one or more embodiments of the present disclosure. The optical repeater 608 includes an optical receiver 610 and an optical transmitter 612. The optical repeater 608 may be connected to an optical fiber 606, for example, at an intermediate portion long the optical fiber 606. The optical receiver 610 may receive an input spatiotemporal pattern 620-1 along a first portion 606-1 of the optical fiber 606, such as transmitted from a transmission device. The optical transmitter may transmit an output spatiotemporal pattern 620-2 along a second portion 606-2 of the optical fiber 606, such as to a reception device.

In some embodiments, the optical receiver 610 and the optical transmitter 612 are electrically connected via transformation logic circuit 624. The transformation logic circuit 624 may be an example of the repeater circuit as described herein, and having one or more logical operations or transformations hard coded into the hardware of the transformation logic circuit 624.

The transformation logic circuit 624 may be configured to perform one or more operations or transformations, for example, on or based on the input spatiotemporal pattern 620-1, in order to generate the output spatiotemporal pattern 620-2. For instance, the output spatiotemporal pattern 620-2 may be based on the input spatiotemporal pattern 620-1 but may be different than the input spatiotemporal pattern 620-1.

The transformation logic circuit 624 may perform these operations or transformations based on analog logic, or hardcoded logic in the hardware components of the transformation logic circuit 624. For instance, the transformation logic circuit 624 may be configured with any number of analog hardware components (e.g., transistors, operational amplifiers, etc.) for performing computations on the electronic signals sent from the optical receiver 610. In some cases, the analog logic may incorporate logic gates constructed from analog components. The transformation logic circuit 624 may function without the use of processing components or software components to perform some or all of the operations. In this way, the transformation logic circuit 624 may operate faster (e.g., over that of processing components) to perform the operations described herein, for example, in order to facilitate a fast optical communication whose latency is not overly degraded at the optical repeater 608.

The transformation logic circuit 624 may perform any of a number of operations. For example, in some cases, the transformation logic circuit is configured to add, subtract, multiply, and/or divide one or more of the cells of the input spatiotemporal pattern 620-1. For instance, the transformation logic circuit 624 may add data unit indicators or values (e.g., bit values) to one or more cells, for example, based on adding, combining, overlaying, etc., colors and/or intensities to one or more cells of the input spatiotemporal pattern 620-1 to generate the output spatiotemporal pattern 620-2. Similarly, the transformation logic circuit 624 may subtract, multiply or divide at one or more cells. The transformation logic circuit 624 may add additional cells to the cells of the input spatiotemporal pattern 620-1, such as appending or including additional encoded data or information to the input spatiotemporal pattern 620-1. The transformation logic circuit 624 may thus generate the output spatiotemporal pattern 620-2 having a different shape, dimensions, quantity of cells, etc. The transformation logic circuit 624 may remap the order (e.g., rearrange the cells) of the input spatiotemporal pattern 620-1 to generate the output spatiotemporal pattern 620-2. For instance, the transformation logic circuit 624 may shift rows and/or columns of the input spatiotemporal pattern 620-1. In some embodiments, the transformation logic circuit 624 performs matrix operations on the input spatiotemporal pattern 620-1, such as adding, subtracting, multiplying, transposing, and/or inverting the input spatiotemporal pattern 620-1.

In some embodiments, the transformation logic circuit 624 performs one or more operations based on the input spatiotemporal pattern 620-1 and based on one or more additional input spatiotemporal patterns. For example, although not shown in FIG. 6, the transformation logic circuit 624 may be connected to and/or associated with any number of optical receivers, for example, such that multiple (e.g., different) input spatiotemporal patterns are utilized as inputs to the transformation logic circuit 624. The transformation logic circuit 624 may be configured to perform transformations or operations based on two or more input spatiotemporal patterns. For instance, the transformation logic circuit 624 may be configured to add cells of some or all of two or more input spatiotemporal patterns. Similarly, the transformation logic circuit 624 may be configured to subtract, multiply, and/or divide cells (e.g., by or with a scalar or another cell) of some or all of two or more input spatiotemporal patterns. In some embodiments, the transformation logic circuit 624 performs matrix operations with two or more input spatiotemporal patterns. In some embodiments, the transformation logic circuit 624 may generate the output spatiotemporal pattern 620-2 by constructing an entirely new spatiotemporal pattern, such as by including one or more rows and/or columns and/or cells from two or more input spatiotemporal patterns and combining them to generate the output spatiotemporal pattern 620-2. The transformation logic circuit 624 may be configured and implemented to perform any number of different operations or transformations based on one, or multiple, input spatiotemporal patterns. For example, the transformation logic circuit 624 may operate based on one or more input spatiotemporal patterns to identify or output a maximum, minimum, central tendency (e.g., mean, median, or mode), variation (e.g., standard deviation or variance), or range of the values of one or more cells. The transformation logic circuit 624 may operate based on one or more input spatiotemporal patterns to perform or output a transposition, reshaping, indexing, slicing, or inversion of a spatiotemporal pattern. The transformation logic circuit 624 may operate based on two or more input spatiotemporal patterns to perform matrix multiplication, concatenation, stacking, dot products, etc. Accordingly, the transformation logic circuit 624 may generate an output spatiotemporal pattern 620-2 that indicates, via the value(s) at one or more cells, the output of an associated transformation or operation (e.g., those described herein or others) of the transformation logic circuit 624.

In this way, the transformation logic circuit 624 may facilitate generating the output spatiotemporal pattern 620-2 based on performing any of a variety of transformations based on the input spatiotemporal pattern 620 (e.g., or multiple inputs). Performing operations in this way may advantageously offload the operations being performed by one or more computing components, or in a software application. For example, in a machine learning application, a trained machine learning model may have certain known weights from the training of the model. Should the model be sufficiently trained, and the weights known to a sufficient level of reliability, the optical repeater 608 may be implemented to apply certain weights to certain calculated values in order to facilitate the machine learning model determining an output. For instance, numerous weights may be applied at the optical repeater 608, for example, through transformations on the various cells of the spatiotemporal pattern. In some cases, multiple optical repeaters 608 could be implemented to weight values of different input data streams.

In another example, the optical repeater 608 may be implemented to append or add information to the underlying encoded data set of the input spatiotemporal pattern 620-1. For example, the optical repeater 608 could add one or more cells indicating header information, for example, to indicate the identity of a transmission device or an intended recipient device. In this way, the optical repeater 608 may be implemented to perform any number of operations or transformations on the optical signals transmitted therethrough in order to advantageously offload such operations from being performed elsewhere, such as by a processing component or software application.

In some embodiments, the features and functionalities described in connection with FIGS. 2-1 through 6 may be combined in any iteration or combination. For example, an optical repeater may be implemented which may fan out or transmit duplicate output spatiotemporal patterns and may also facilitate implementing a transmission angle for one or more of the associated optical fibers. In another example, an optical repeater may be implemented which may facilitate relaying a first output spatiotemporal pattern that is the same as an input spatiotemporal pattern, as well as a second output spatiotemporal pattern that is different, such as having one or more transformations or operations performed thereon by a transformation logic circuit of the optical repeater. In another example, an optical repeater may be implemented that transmits a first output spatiotemporal pattern based on performing a first operation and a second output spatiotemporal pattern based on performing a second operations. The first and second operations may be based on the same, or different set of input spatiotemporal patterns. In this way, any combination of the features and functionalities of the optical repeaters described herein may be implemented.

Figure 7:
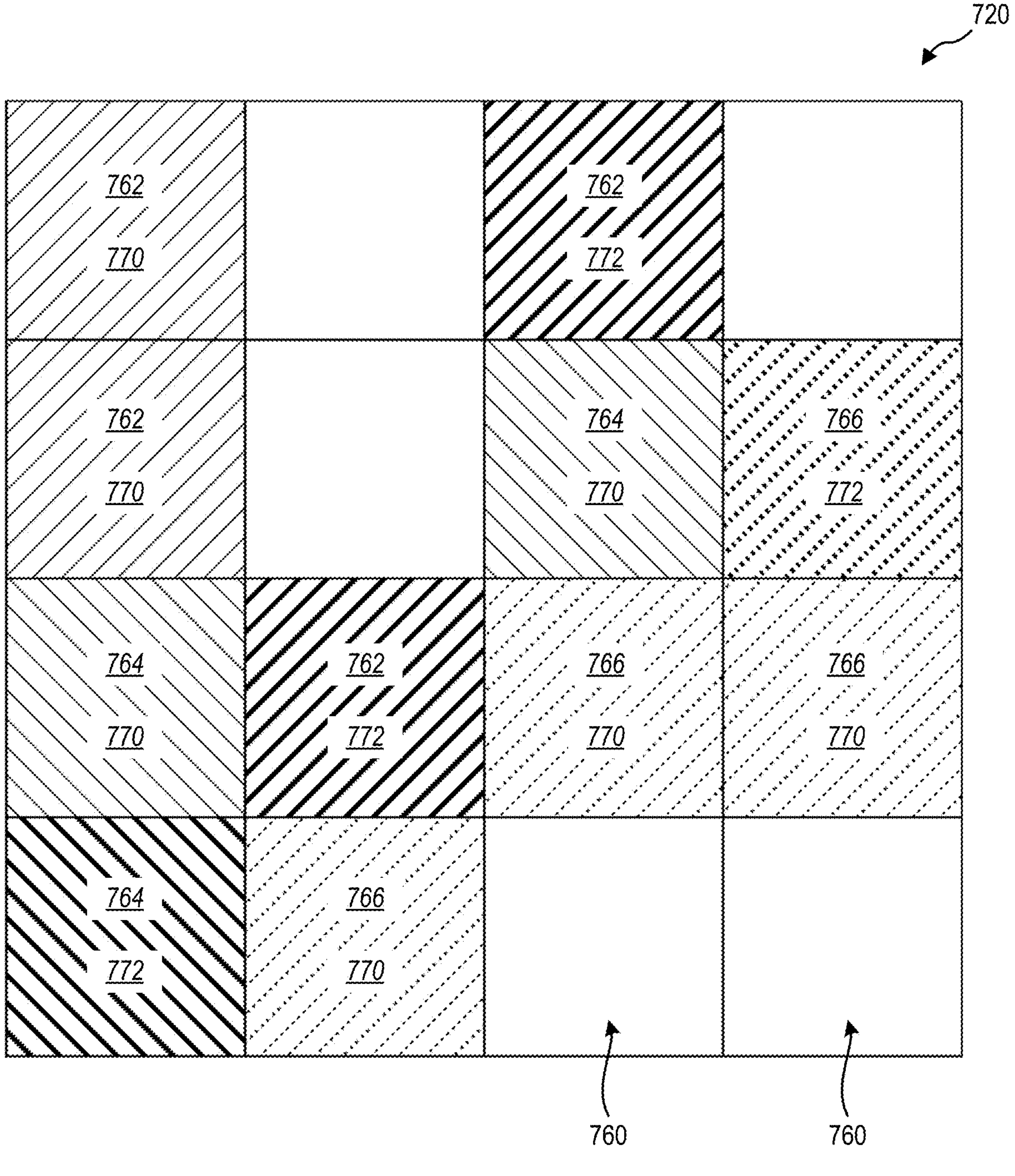
FIG. 7 illustrates an example of a spatiotemporal pattern, according to at least one embodiment of the present disclosure.

FIG. 7 illustrates an example of a spatiotemporal pattern 720, according to at least one embodiment of the present disclosure. The spatiotemporal pattern 720 may be a pattern of light signals observed in both space and time. For example, the spatiotemporal pattern 720 may comprise a plurality of cells 760. The cells 760 may represent localized areas within an optical transmission medium for communicating information based on the electromagnetic properties of the light signal in that localized area or cell. The spatiotemporal pattern may be comprised of a grid, array, pattern, or other structured scheme of cells 760. For instance, in some cases the spatiotemporal pattern 720 is a matrix of cells. For example, the spatiotemporal pattern 720 may be a square or non-square matrix. One or more dimensions of the spatiotemporal pattern 720 may be 1 cell, 2 cells, 4 cells, 8 cells, 10 cells, 20 cells, 30 cells, 40 cells, 50 cells, 60 cells, or more cells, and any number therebetween. As shown herein, in some cases the spatiotemporal pattern 720 is a 4×4 matrix of 16 cells 760.

The spatiotemporal pattern 720 may communicate information based on presenting or displaying electromagnetic properties of a light signal at one or more (or each) of the cells 760. For instance, the spatiotemporal pattern 720 may be configured based on one or more cells presenting one or more colors or wavelengths of light, one or more intensities of light, or other electromagnetic property capable of transmission through an optical fiber (e.g., a TALOF). In some cases, the cells 760 may be configured to present a light signal of visible light (e.g., 400 to 700 nanometers) having a first color 762 or a second color 764 of different wavelengths. The cells 760 may be configured to present any number of different colors of visible light. In some embodiments, the cells 760 are configured to present near-visible wavelengths of light 766, such as infrared (e.g., 780 nanometers to 1 millimeter) or ultraviolet light (e.g., 100 to 400 nanometers). The cells may be configured to present near-visible light signals at any of a number of different wavelengths. In some embodiments, the cells 760 are configured to present light signals having a given intensity, such as light signals of a first intensity 770 and a second intensity 772 that is different. In some embodiments, the cells 760 are configured to present no light signal, or a white light signal. In this way, the various electromagnetic properties presentable at each cell may facilitate indicating, for example, "on" and/or "off" signals for a binary encoding scheme, "0" and/or "1" and/or "2" values for a ternary encoding scheme, or any other value or signal for any other encoding scheme.

The spatiotemporal pattern 720 may be implemented to communicate an underlying data set. For example, a data set may be encoded into one or more spatiotemporal patterns as data units represented at some or all of the cells 760. For example, each cell 760, based on the variations in electromagnetic properties capable of being displayed at the cells 760, may be configured to communicate a data unit of an encoding scheme, such as a bit for a binary encoding scheme. Given that a wide variety of electromagnetic properties (e.g., colors, intensities, etc.) may be capable of presenting at each cell 760, any number of (e.g., more sophisticated) encoding schemes are conceivable, such as ternary, quaternary, or other higher-order data encoding schemes. In this way, data may be communicated based on the specific light signals presented at each cell of the spatiotemporal pattern 720.

In some embodiments, the data is not serialized before it is encoded. For instance, the data can be sent as non-serialized data in a matrix form. One possible benefit of transmitting non-serialized data is that there is no need to go through multiple physical or software component layers between applications, saving time on serialization, deserialization, and data transmission. Another possible benefit of transmitting non-serialized data is that data corruption, data throttling, other possibilities, or combinations thereof may be minimized. In some cases, one or more cells of the spatiotemporal pattern 720, or in some cases the entire spatiotemporal pattern 720, may be serialized and transmitted successively, such as generating and transmitting a series of spatiotemporal patterns in succession. In this way, multiple data units may be transmitted in parallel via each spatiotemporal pattern, with one or more (or all) data units conveying data units in a serialized manner to communicate a data stream. In this way, the spatiotemporal pattern 720 may facilitate implementing any of a number of encoding schemes, such as more sophisticated and/or higher-order encoding schemes to that of binary.

As an illustrative example, in embodiments where the spatiotemporal pattern 720 includes at least two wavelengths (e.g., including colors of visible light and/or wavelengths of near-visible light), both wavelengths may be used for encoding the data. For example, instead of using a typical two-bit, binary encoding system (1 and 0), the system could use three or more indicators or data units, where each color represents a unique data unit (such as a two-wavelength system or a three-wavelength system when using three or four indicators, respectively). In at least one embodiment, where at least two different wavelengths are used for encoding data, one possible benefit of using higher-order encoding (e.g., more than binary) allows data to be encoded more efficiently and outputting the encoded data more rapidly than with a binary encoding system. Another possible benefit of using two or more wavelengths is to provide flexibility and/or improvements to bandwidth through the use of more indicators for the encoding scheme.

In another example, in embodiments where the spatiotemporal pattern 720 includes a first intensity level and a second intensity level, the two different intensity levels may be used for encoding the data. For example, the first level of intensity and the second level of intensity may provide values (such as 1 and 0) that are encodable by the encoder for encoding the data. For example, the spatiotemporal pattern 720 may include a given color or wavelength in a first intensity level, having a value of 1, and the given color in a second intensity level, having a value of 0. Leveraging the different intensity levels in this way may provide an alternative, or additional indicators for a given encoding scheme. For example, an encoding scheme, such as that shown in FIG. 7, may implement 3 different wavelengths each at two different intensity levels for a total of 7 different indicators (e.g., including no light as an "off" or "0" indicator) in a $7^{th}$-order (e.g., septenary) data encoding scheme.

In this way, the spatiotemporal pattern 720 may be representative of and/or may communicate an underlying data set. For instance, the spatiotemporal pattern 720 may be transmitted through the optical techniques described herein in order to communicate the underlying data set that is encoded into the spatiotemporal pattern 720. In one example, a transmitting device may encode a data set into one or more spatiotemporal patterns 720 and may transmit the spatiotemporal pattern(s) as described herein to a receiving device, which may decode the spatiotemporal pattern(s) to obtain the underlying data set. In this way, the spatiotemporal pattern(s) may be considered data-carrying, data-transmitting, and/or data-encoded spatiotemporal pattern(s). Spatiotemporal patterns that communicate an encoded data set in this way may be in contrast to, for example, transmitting solely an image (e.g., pattern of light signals) by way of the localized optical techniques described herein. For example, in some cases, an image may be generated at a transmission device and may be transmitted through an optical fiber, which may be presented at another end of the optical fiber, or at another device. In such cases, the image itself (e.g., a pattern of light signals) is considered to be the data being transmitted, rather than a data set being encoded into the image. For example, transmission of images in this way may be for the sake of transmitting an image only, and not for the purpose of decoding a data set from the image.

Figure 8:
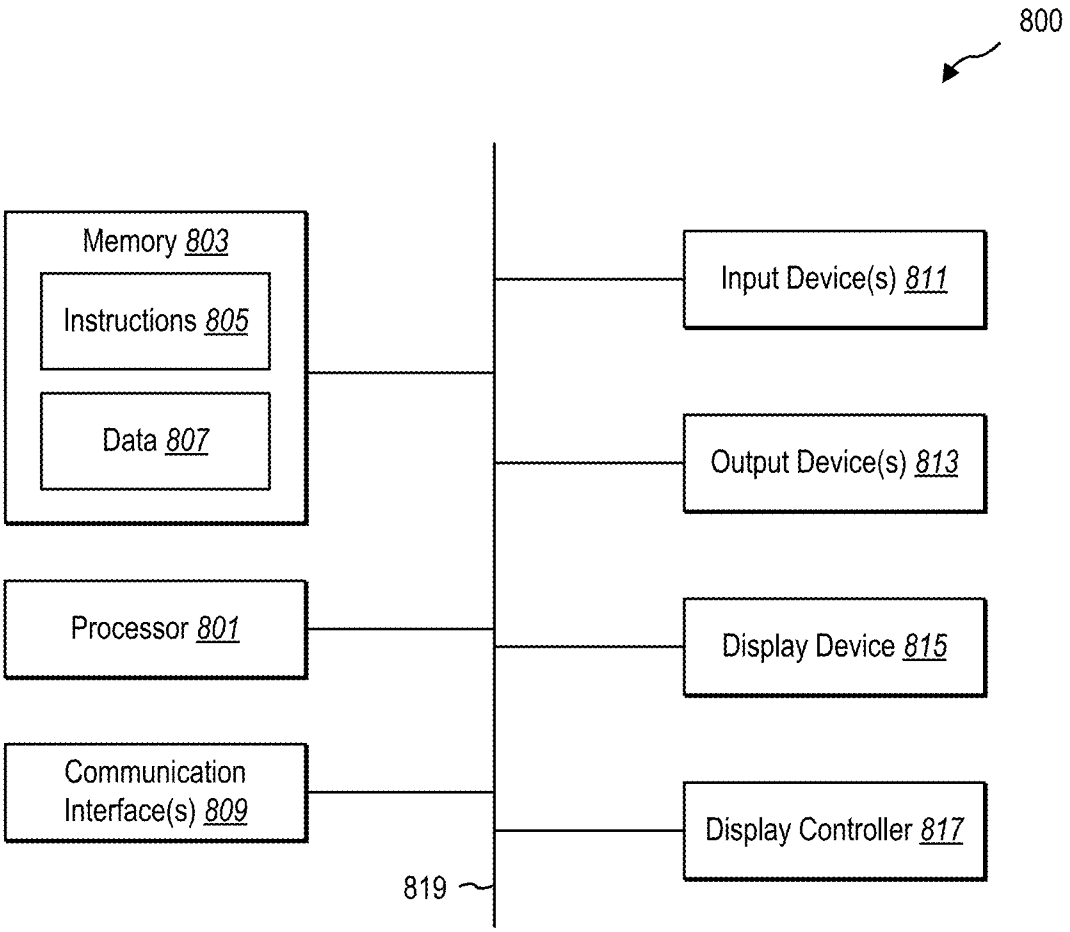
FIG. 8 illustrates certain components that may be included within a computing system.

Turning now to FIG. 8, this figure illustrates certain components that may be included within a computer system 800. One or more computer systems 800 may be used to implement the various devices, components, and systems described herein. For example, the example computer system 800 may describe one or more features, functionalities, or components of a transmission device or reception device as described herein for communicating via optical signals. In some embodiments, an optical repeater as described herein may include one or more components as described in the computer system 800.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may include computer-readable storage media and can be any available media that can be accessed by a general purpose or special purpose computer system. Computer-readable media that store computer-executable instructions are non-transitory computer-readable media (device). Computer-readable media that carry computer-executable instructions are transmission media. Thus, by way of example and not limitations, embodiment of the present disclosure can comprise at least two distinctly different kinds of computer-readable media: non-transitory computer-readable media (devices) and transmission media.

Both non-transitory computer-readable media (devices) and transmission media may be used temporarily to store or carry software instructions in the form of computer readable program code that allows performance of embodiments of the present disclosure. Non-transitory computer-readable media may further be used to persistently or permanently store such software instructions. Examples of non-transitory computer-readable storage media include physical memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other non-transmission medium which can be used to store program code in the form of computer-executable instructions or data structures and which can be accessed by a general purpose or special purpose computer, whether such program code is stored or in software, hardware, firmware, or combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The communication interfaces 809 may connect the computer system 800 to a network. A "network" or "communications network" may generally be defined as one or more data links that enable the transport of electronic data between computer systems and/or modules, engines, or other electronic devices, or combinations thereof. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instruction or data structures and which can be accessed by a general purpose or special purpose computer.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into one or more of text, graphics, or moving images (as appropriate) shown on the display device 815.

The various components of the computer system 800 may be coupled together by one or more buses, which may include one or more of a power bus, a control signal bus, a status signal bus, a data bus, other similar components, or combinations thereof. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Further, upon reaching various computer system components, program code in the form of computer-executable instructions or data structures can be transferred automatically or manually from transmission media to non-transitory computer-readable storage media (or vice versa). For example, computer executable instructions or data structures received over a network or data link can be buffered in memory (e.g., RAM) within a network interface module (NIC), and then eventually transferred to computer system RAM and/or to less volatile non-transitory computer-readable storage media at a computer system. Thus, it should be understood that non-transitory computer-readable storage media can be included in computer system components that also (or even primarily) utilize transmission media.

Figure 9:
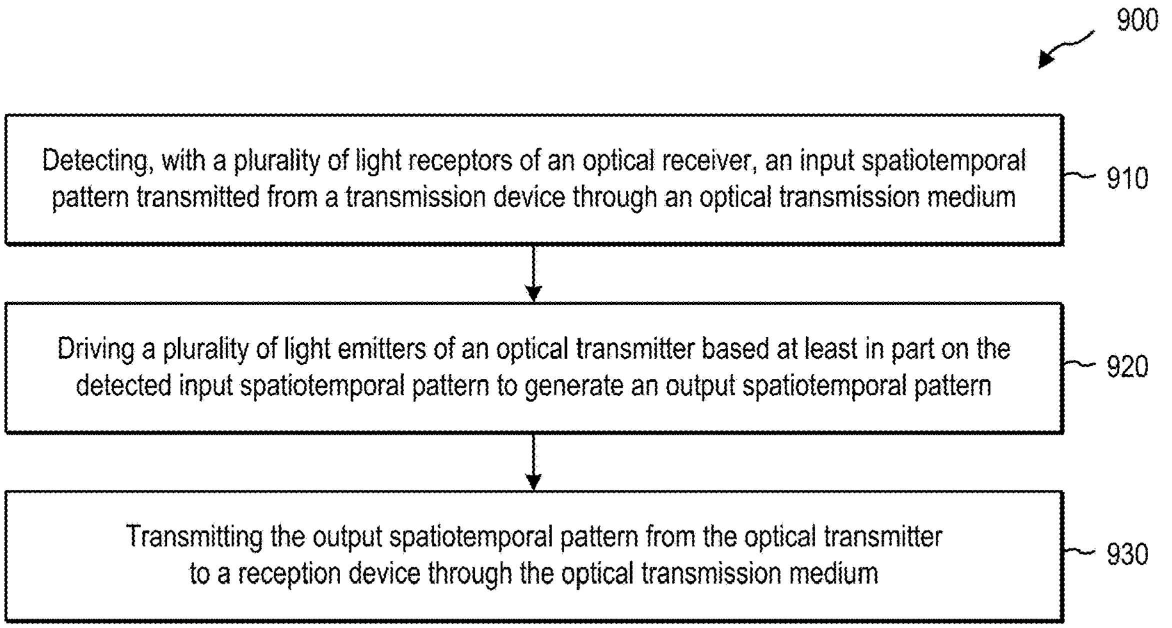
FIG. 9 illustrates a flow diagram for a method or a series of acts for communicating spatiotemporal patterns as described herein, according to at least one embodiment of the present disclosure.

FIG. 9 illustrates a flow diagram for a method 900 or a series of acts for communicating spatiotemporal patterns as described herein, according to at least one embodiment of the present disclosure. While FIG. 9 illustrates acts according to one embodiment, alternative embodiments may add to, omit, reorder, or modify any of the acts of FIG. 9. In some embodiments, the acts of FIG. 9 are performed by a system. in some embodiments, the acts of FIG. 9 are performed as instructions stored on a non-transitory computer readable storage medium.

In some embodiments, the method 900 includes an act 910 of detecting, with a plurality of light receptors of an optical receiver, an input spatiotemporal pattern transmitted from a transmission device through an optical transmission medium.

In some embodiments, the method 900 includes an act 920 of driving a plurality of light emitters of an optical transmitter based at least in part on the detected input spatiotemporal pattern to generate an output spatiotemporal pattern.

In some embodiments, the method 900 includes an act 930 of transmitting the output spatiotemporal pattern from the optical transmitter to a reception device through the optical transmission medium.

In some embodiments, the method 900 further includes driving the plurality of light emitters with an analog circuit connecting the plurality of light receptors to the plurality of light emitters.

In some embodiments, the method 900 further includes detecting the input spatiotemporal pattern with the plurality of light receptors and driving the plurality of light emitters without any processing components.

In some embodiments, the input spatiotemporal pattern and the output spatiotemporal pattern are the same.

In some embodiments, driving the plurality of light emitters includes performing one or more transformations on the input spatiotemporal pattern to generate the output spatiotemporal pattern that is different than the input spatiotemporal pattern.

In some embodiments, the one or more transformations include adding to, subtracting from, multiplying, dividing, performing matrix operations on, or 2- or 3-dimensional remapping of some or all of the input spatiotemporal pattern to generate the output spatiotemporal pattern.

In some embodiments, the one or more transformations are based on a second input spatiotemporal pattern received by a second optical receiver.

In some embodiments, the method 900 further includes encoding a first data set into the input spatiotemporal pattern, and transmitting the first data set via the input spatiotemporal pattern with the transmission device.

In some embodiments, the method 900 further includes encoding the first data set into the input spatiotemporal pattern as Transverse Anderson Localizations of light comprising a plurality of cells of the input spatiotemporal pattern for transmitting via a Transvers Anderson Localization Optical Fiber (TALOF).

In some embodiments, the method 900 further includes receiving the output spatiotemporal pattern with the reception device and decoding a second data set from the output spatiotemporal pattern with the reception device.

In some embodiments, the method 900 further includes receiving the output spatiotemporal pattern as Transverse Anderson Localizations of light transmitted via the TALOF and decoding the second data set from the output spatiotemporal pattern.

In some embodiments, the first data set and the second data set are the same data set.

In some embodiments, the method 900 further includes communicating spatiotemporal patterns from the transmission device to the reception device over a transmission path through the optical transmission medium that is greater than 3 meters.

In some embodiments, the method 900 further includes communicating spatiotemporal patterns from the transmission device to the reception device over a transmission path through the optical transmission medium that is greater than 5 meters.

In some embodiments, the method 900 further includes communicating spatiotemporal patterns from the transmission device to the reception device over a transmission path through the optical transmission medium that is greater than 10 meters.

In some embodiments, the method 900 further includes driving a plurality of light emitters of a plurality of optical transmitters to generate and transmit a plurality of instances of the output spatiotemporal pattern along a plurality of optical fibers to a plurality of reception devices.

In some embodiments, the method 900 further includes detecting the input spatiotemporal pattern from a first direction and transmitting the output spatiotemporal pattern in a second direction that is different from the first direction.

Figure 10:
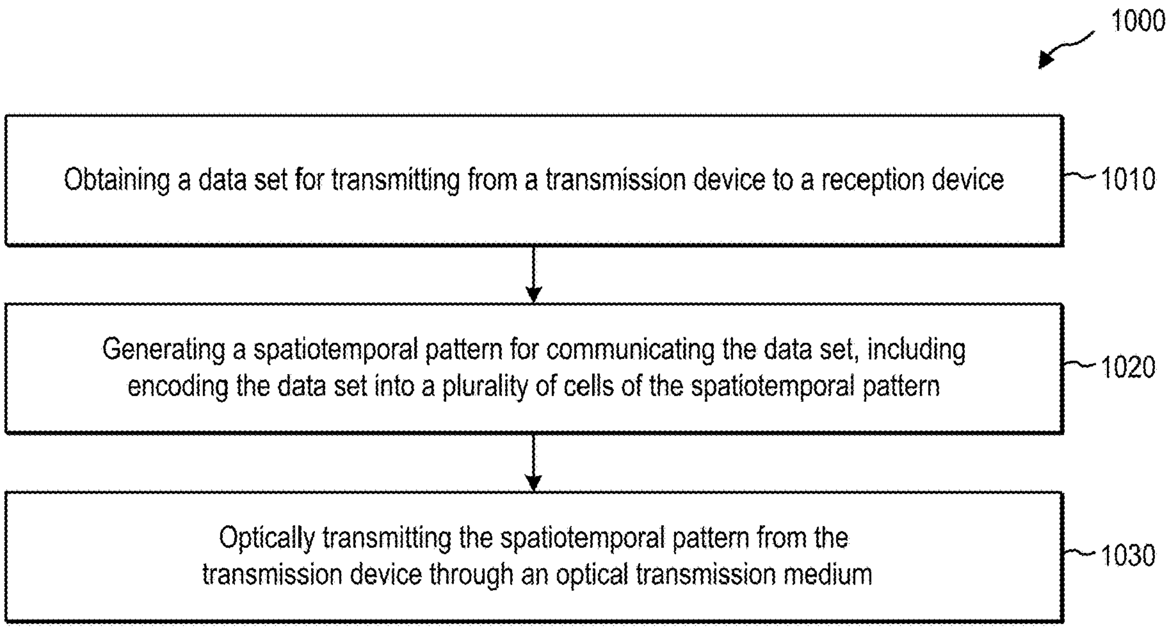
FIG. 10 illustrates a flow diagram for a method or a series of acts for transmitting data as described herein, according to at least one embodiment of the present disclosure.

FIG. 10 illustrates a flow diagram for a method 1000 or a series of acts for transmitting data as described herein, according to at least one embodiment of the present disclosure. While FIG. 10 illustrates acts according to one embodiment, alternative embodiments may add to, omit, reorder, or modify any of the acts of FIG. 10. In some embodiments, the acts of FIG. 10 are performed by a system. in some embodiments, the acts of FIG. 10 are performed as instructions stored on a non-transitory computer readable storage medium.

In some embodiments, the method 1000 includes an act 1010 of obtaining a data set for transmitting from a transmission device to a reception device.

In some embodiments, the method 1000 includes an act 1020 of generating a spatiotemporal pattern for communicating the data set, including encoding the data set into a plurality of cells of the spatiotemporal pattern.

In some embodiments, the method 1000 includes an act 1030 of optically transmitting the spatiotemporal pattern from the transmission device through an optical transmission medium.

In some embodiments, the method 1000 further includes receiving the spatiotemporal pattern at the reception device through the optical transmission medium, and decoding the spatiotemporal pattern to obtain the data set.

In some embodiments, optically transmitting includes optically transmitting the spatiotemporal pattern configured as Transverse Anderson Localizations (TAL) of light.

In some embodiments, the optical transmission medium is a Transverse Anderson Localization Optical Fiber (TALOF).

In some embodiments, optically transmitting includes transmitting the plurality of cells of the spatiotemporal pattern in parallel through the optical transmission medium.

In some embodiments, optically transmitting includes relaying the spatiotemporal pattern along the optical transmission medium with an optical repeater positioned on a transmission path of the optical transmission medium.

In some embodiments, relaying includes transmitting the spatiotemporal pattern from the optical repeater to the reception device as if the spatiotemporal pattern was transmitted to the reception device directly from the transmission device, In some embodiments, relaying includes receiving the spatiotemporal pattern with the optical repeater as an input spatiotemporal pattern, performing one or more transformations to the input spatiotemporal pattern with the optical repeater to generate an output spatiotemporal pattern, and transmitting the output spatiotemporal pattern from the optical repeater to the reception device.

In some embodiments, the method 1000 further includes performing the one or more transformations with analog logic of a transformation logic circuit.

In some embodiments, the method 1000 further includes performing the one or more transformations without a processing component.

INDUSTRIAL APPLICABILITY

The following sections include various embodiments that, where feasible, may be combined in any permutation. For example, the embodiment of section A1 may be combined with any or all embodiments of the following sections. Embodiments that describe acts of a method may be combined with embodiments that describe, for example, systems and/or devices. Any permutation of the following sections is considered to be hereby disclosed for the purposes of providing "unambiguously derivable support" for any claim amendment based on the following sections. Furthermore, the following sections provide support such that any combination of the following sections would not create an "intermediate generalization."

A1. An optical repeater for communicating optical signals between a transmission device and a reception device through an optical transmission medium, the optical repeater comprising:

an optical receiver positioned on a transmission path of the optical signals and being configured to detect an input spatiotemporal pattern transmitted from the transmission device; and an optical transmitter positioned on the transmission path of the optical signals and electronically connected to the optical receiver, the optical transmitter being configured to transmit an output spatiotemporal pattern to the reception device, the output spatiotemporal pattern being based at least in part on the input spatiotemporal pattern.

A2. The optical repeater of A1, wherein the optical receiver and the optical transmitter are electronically connected by a repeater circuit for driving the transmission of the output spatiotemporal pattern transmitted by the optical transmitter based on the detection of the input spatiotemporal pattern by the optical receiver.

A3. The optical repeater of A2, wherein the repeater circuit is an analog circuit.

A4. The optical repeater of A2 or A3, wherein the repeater circuit does not include any processing components or software components.

A5. The optical repeater of any of A1-A4, wherein the input spatiotemporal pattern and the output spatiotemporal pattern are the same.

A6. The optical repeater of any of A1-A5, wherein the optical transmission medium is an optical fiber or a waveguide.

A7 The optical repeater of any of A1-A6, wherein the optical signals include the input spatiotemporal pattern and the output spatiotemporal pattern configured based on Transverse Anderson Localization (TAL) of light.

A8. The optical repeater of any of A1-A7, wherein the optical transmission medium is a Transverse Anderson Localization Optical Fiber (TALOF).

A9. The optical repeater of any of A1-A8, wherein the optical receiver includes a light receptor array having a plurality of light receptors for detecting the input spatiotemporal pattern through a plurality of index locations of the plurality of light receptors.

A10. The optical repeater of A9, wherein the optical receiver includes one or more CMOS optical sensors.

A11. The optical repeater of A9 or A10, wherein the optical transmitter includes a light emitter array having a plurality of light emitters for transmitting the output spatiotemporal pattern through a plurality of index locations of the plurality of light emitters.

A12. The optical repeater of A11, wherein the plurality of light emitters include one or more of a light emitting diode (LED), or a laser.

A13. The optical repeater of A11 or A12, wherein the optical transmitter is a micro-LED display.

A14. The optical repeater of any of A11-A13, wherein the input and output spatiotemporal patterns each communicate an encoded data set via a plurality of cells.

A15. The optical repeater of A14, wherein the input and output spatiotemporal patterns each include a matrix of the plurality of cells.

A16. The optical repeater of A14-A15, wherein the transmission path of the optical signals from the transmission device to the reception device is greater than 3 meters.

A17. The optical repeater of any of A14-A16, wherein the transmission path of the optical signals from the transmission device to the reception device is greater than 5 meters.

A18. The optical repeater of any of A14-A17, wherein the transmission path of the optical signals from the transmission device to the reception device is greater than 10 meters.

A19. The optical repeater of any of A1-A18, wherein the optical transmitter is a first optical transmitter and the reception device is a first reception device, and the optical repeater further comprises a second optical transmitter configured to transmit the output spatiotemporal pattern to a second reception device along a second optical fiber.

A20. The optical repeater of any of A1-A20, wherein the optical receiver is configured to receive the input spatiotemporal pattern from a first direction, and the optical transmitter is configured to transmit the output spatiotemporal pattern in a second direction that is different than the first direction.

A21. The optical repeater of A20, wherein the optical receiver is configured to receive the input spatiotemporal pattern from the first direction and the optical transmitter is configured to transmit the output spatiotemporal pattern in the second direction without bending the optical transmission medium.

A22. The optical repeater of A1-A21, wherein one or more of the optical receiver or the optical transmitter is butt coupled to an optical face of the optical transmission medium.

A23. The optical repeater of any of A1-A22, wherein the optical transmission medium includes a first portion and a second portion, and wherein the optical receiver and the optical transmitter are positioned between the first portion and the second portion on the transmission path to optically connect the first portion and the second portion.

A24. The optical repeater of any of A1-A23, wherein the optical transmitter and the optical receiver are included on a same printed circuit board (PCB).

A25. The optical repeater of A24, wherein the optical transmitter and the optical receiver are positioned on opposite sides of the PCB.

A26. The optical repeater of any of A1-A25, wherein the optical receiver is a first optical receiver, the transmission device is a first transmission device, and the input spatiotemporal pattern is a first input spatiotemporal pattern, wherein the optical repeater further comprises a second optical receiver configured to detect a second input spatiotemporal pattern from a second transmission device, wherein the output spatiotemporal pattern is based at least in part on the first input spatiotemporal pattern and at least in part on the second input spatiotemporal pattern.

A27. The optical repeater of A26, wherein the first optical receiver and the second optical receiver are connected to the optical transmitter via a transformation logic circuit configured to generate the output spatiotemporal pattern based on analog logic of the transformation logic circuit operating on the first input spatiotemporal pattern and the second input spatiotemporal pattern.

A28. The optical repeater of A27, wherein the analog logic of the transformation logic circuit is configured to perform one or more of add, subtract, multiple, or divide at one or more cells of the input spatiotemporal pattern to generate the output spatiotemporal pattern.

A29. The optical repeater of any of A1-A28, wherein the optical transmitter and the optical receiver are connected by a transformation logic circuit configured to generate the output spatiotemporal pattern based on analog logic of the transformation logic circuit operating on the input spatiotemporal pattern.

A30. The optical repeater of A29, wherein the analog logic of the transformation logic circuit is configured to perform one or more of add to, subtract from, multiple, or divide at one or more cells of the input spatiotemporal pattern to generate the output spatiotemporal pattern.

A31. The optical repeater of A30, wherein the analog logic of the transformation logic circuit is configured to perform one or more of matrix operations on some or all of the input spatiotemporal pattern, 2-dimensional or 3-dimensional remapping of some or all of the input spatiotemporal pattern, or adding additional encoded data to some or all of the input spatiotemporal pattern.

A32. The optical repeater of A30 or A31, wherein the input spatiotemporal pattern is a data-encoded input spatiotemporal pattern for communicating an encoded first data set and the output spatiotemporal pattern is a data-encoded output spatiotemporal pattern for communicating an encoded second data set.

A33. The optical repeater of any of A29-A32, wherein the analog logic is hardcoded into hardware of the transformation logic circuit.

B1 An optical communication system, comprising:

an optical transmission medium for transmitting optical signals from a transmission device through a first portion of the optical transmission medium to a reception device through a second portion of the optical transmission medium; and an optical repeater positioned on a transmission path of the optical signals between the first portion and the second portion of the optical transmission medium, the optical repeater including:

an optical receiver coupled to the first portion and configured to detect an input spatiotemporal pattern transmitted from the transmission device;

an optical transmitter coupled to the second portion and configured to transmit an output spatiotemporal pattern to the reception device; and a repeater circuit electronically connecting the optical receiver and the optical transmitter and configured to generate the output spatiotemporal pattern based at least in part on the input spatiotemporal pattern.

B2 The optical communication system of B1, wherein the input spatiotemporal pattern and the output spatiotemporal pattern are the same.

B3 The optical communication system of B1 or B2, wherein the repeater circuit is configured to perform one or more transformations on the input spatiotemporal pattern to generate the output spatiotemporal pattern.

B4 The optical communication system of B3, wherein the repeater circuit is an analog circuit.

B5. The optical communication system of B3 or B4, wherein the repeater circuit does not include any processing components.

B6 The optical communication system of any of B3-B5, wherein the one or more transformations include one or more of adding to, subtracting from, multiplying, dividing, performing matrix operations on, or 2- or 3-dimensional remapping of one or more cells of the input spatiotemporal pattern.

B7 The optical communication system of B6, wherein the one or more transformations are based on a second input spatiotemporal pattern received by a second optical receiver connected to the repeater circuit.

B8. The optical communication system of B6 or B7, wherein the optical transmitter is an optical transmitter of a plurality of optical transmitters of the optical repeater, and wherein the optical repeater is configured to transmit, with the plurality of optical transmitters, the output spatiotemporal pattern along a plurality of optical fibers to a plurality of reception devices.

B9. The optical communication system of any of B1-B8, wherein the input and output spatiotemporal patterns are configured based on Transverse Anderson Localization of light.

B10. The optical communication system of any of B1-B9, wherein the optical transmission medium is a Transverse Anderson Localization Optical Fiber (TALOF).

B11. The optical communication system of any of B1-B10, wherein the optical repeater is configured as the optical repeater of any of A1-A33.

C1. A method of communicating spatiotemporal patterns, comprising:

detecting, with a plurality of light receptors of an optical receiver, an input spatiotemporal pattern transmitted from a transmission device through an optical transmission medium;

driving a plurality of light emitters of an optical transmitter based at least in part on the detected input spatiotemporal pattern to generate an output spatiotemporal pattern; and transmitting the output spatiotemporal pattern from the optical transmitter to a reception device through the optical transmission medium.

C2. The method of C1, further comprising driving the plurality of light emitters with an analog circuit connecting the plurality of light receptors to the plurality of light emitters.

C3. The method of C1 or C2, further comprising detecting the input spatiotemporal pattern with the plurality of light receptors and driving the plurality of light emitters without any processing components.

C4. The method of any of C1-C3, wherein the input spatiotemporal pattern and the output spatiotemporal pattern are the same.

C5. The method of any of C1-C4, wherein driving the plurality of light emitters includes performing one or more transformations on the input spatiotemporal pattern to generate the output spatiotemporal pattern that is different than the input spatiotemporal pattern.

C6. The method of C5, wherein the one or more transformations include adding to, subtracting from, multiplying, dividing, performing matrix operations on, or 2- or 3-dimensional remapping of some or all of the input spatiotemporal pattern to generate the output spatiotemporal pattern.

C7. The method of C5 or C6, wherein the one or more transformations are based on a second input spatiotemporal pattern received by a second optical receiver.

C8. The method of any of C5-C7, further comprising encoding a first data set into the input spatiotemporal pattern, and transmitting the first data set via the input spatiotemporal pattern with the transmission device.

C9 The method of C8, further comprising encoding the first data set into a plurality of cells of the input spatiotemporal pattern based on Transverse Anderson Localization of light for transmitting the input spatiotemporal pattern through a Transverse Anderson Localization Optical Fiber (TALOF).

C10. The method of C8 or C9, further comprising receiving the output spatiotemporal pattern with the reception device and decoding a second data set from the output spatiotemporal pattern with the reception device.

C11. The method of C10, further comprising receiving the output spatiotemporal pattern as a plurality a cells of the output spatiotemporal pattern configured based on Transverse Anderson Localization of light transmitted through the TALOF, and further comprising decoding the second data set from the output spatiotemporal pattern.

C12. The method of C10 or C11, wherein the first data set and the second data set are the same data set.

C13. The method of any of C1-C12, further comprising communicating spatiotemporal patterns from the transmission device to the reception device over a transmission path through the optical transmission medium that is greater than 3 meters.

C14. The method of any of C1-C13, further comprising communicating spatiotemporal patterns from the transmission device to the reception device over a transmission path through the optical transmission medium that is greater than 5 meters.

C15. The method of any of C1-C14, further comprising communicating spatiotemporal patterns from the transmission device to the reception device over a transmission path through the optical transmission medium that is greater than 10 meters.

C16. The method of any of C1-C15, further comprising driving a plurality of light emitters of a plurality of optical transmitters to generate and transmit a plurality of instances of the output spatiotemporal pattern along a plurality of optical fibers to a plurality of reception devices.

C17. The method of any of C1-C16, further comprising detecting the input spatiotemporal pattern from a first direction and transmitting the output spatiotemporal pattern in a second direction that is different from the first direction.

D1. A method for transmitting data, comprising:

obtaining a data set for transmitting from a transmission device to a reception device;

generating a spatiotemporal pattern for communicating the data set, including encoding the data set into a plurality of cells of the spatiotemporal pattern; and optically transmitting the spatiotemporal pattern from the transmission device through an optical transmission medium.

D2 The method of D1, further comprising receiving the spatiotemporal pattern at the reception device through the optical transmission medium, and decoding the spatiotemporal pattern to obtain the data set.

D3. The method of D1 or D2, wherein optically transmitting includes optically transmitting a plurality of cells of the spatiotemporal pattern configured based on Transverse Anderson Localization (TAL) of light.

D4 The method of any of D1-D3, wherein the optical transmission medium is a Transverse Anderson Localization Optical Fiber (TALOF).

D5. The method of any of D1-D4, wherein optically transmitting includes transmitting the plurality of cells of the spatiotemporal pattern in parallel through the optical transmission medium.

D6. The method of any of D1-D5, wherein optically transmitting includes relaying the spatiotemporal pattern along the optical transmission medium with an optical repeater positioned on a transmission path of the optical transmission medium.

D7. The method of D6, wherein relaying includes transmitting the spatiotemporal pattern from the optical repeater to the reception device as if the spatiotemporal pattern was transmitted to the reception device directly from the transmission device.

D8. The method of D6 or D7, wherein relaying includes:

receiving the spatiotemporal pattern with the optical repeater as an input spatiotemporal pattern;

performing one or more transformations to the input spatiotemporal pattern with the optical repeater to generate an output spatiotemporal pattern; and transmitting the output spatiotemporal pattern from the optical repeater to the reception device.

D9. The method of D8, further comprising performing the one or more transformations with analog logic of a transformation logic circuit.

D10. The method of D8 or D9, further comprising performing the one or more transformations without a processing component.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers'specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that the accompanying figures of this disclosure are presenting for illustrative purposes. In some cases, one or more figures may not be to scale, may be schematic, may omit one or more components, may be exaggerated, and/or may otherwise be depicted in an illustrative manner as an aid in the discussion herein.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Additionally, as used herein, the term "and/or" includes any and all combinations of one or more of the associated listed items.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An optical repeater for communicating optical signals between a transmission device and a reception device through an optical transmission medium, the optical repeater comprising:

an optical receiver positioned on a transmission path of the optical signals and being configured to detect an input spatiotemporal pattern transmitted from the transmission device, the input spatiotemporal pattern comprising a plurality of input cells arranged at different spatial locations in a transverse cross-section of the optical transmission medium; and an optical transmitter positioned on the transmission path of the optical signals and electronically connected to the optical receiver, the optical transmitter being configured to transmit an output spatiotemporal pattern to the reception device, the output spatiotemporal pattern comprising a plurality of output cells arranged at different spatial locations in a transverse cross-section of the optical transmission medium, wherein the output spatiotemporal pattern is based at least in part on the input spatiotemporal pattern.

2. The optical repeater of claim 1, wherein the optical receiver and the optical transmitter are electronically connected by a repeater circuit to transmit the output spatiotemporal pattern transmitted by the optical transmitter based on detection of the input spatiotemporal pattern by the optical receiver, wherein the repeater circuit is an analog circuit that does not include any processing components.

3. The optical repeater of claim 1, wherein the plurality of input cells of the input spatiotemporal pattern is different from the plurality of output cells of the output spatiotemporal pattern.

4. The optical repeater of claim 1, wherein the optical transmission medium is a Transverse Anderson Localization Optical Fiber (TALOF), and the plurality of input cells are transmitted through the TALOF as spatially localized optical channels that are transmitted in parallel.

5. The optical repeater of claim 1, wherein the optical transmitter is a micro-LED display.

6. The optical repeater of claim 1, wherein the input and output spatiotemporal patterns each communicate the respective pluralities of cells arranged at different spatial locations based on Transverse Anderson Localization (TAL) of light.

7. The optical repeater of claim 1, wherein the transmission path of the optical signals from the transmission device to the reception device is greater than 3 meters.

8. The optical repeater of claim 1, wherein the optical transmitter is a first optical transmitter and the reception device is a first reception device, and the optical repeater further comprises a second optical transmitter configured to transmit the output spatiotemporal pattern to a second reception device along a second optical fiber.

9. The optical repeater of claim 1, wherein the optical receiver is configured to receive the input spatiotemporal pattern from a first direction, and the optical transmitter is configured to transmit the output spatiotemporal pattern in a second direction that is different than the first direction without bending the optical transmission medium.

10. The optical repeater of claim 1, wherein the optical receiver is a first optical receiver, the transmission device is a first transmission device, and the input spatiotemporal pattern is a first input spatiotemporal pattern comprising a plurality of first input cells transmitted through a first optical transmission medium, wherein the optical repeater further comprises a second optical receiver configured to detect a second input spatiotemporal pattern from a second transmission device through a second optical transmission medium, the second input spatiotemporal pattern comprising a plurality of second input cells arranged at different spatial locations in a transverse cross-section of the second optical transmission medium, wherein the output spatiotemporal pattern is based at least in part on the first input spatiotemporal pattern and at least in part on the second input spatiotemporal pattern.

11. The optical repeater of claim 1, wherein the optical transmitter and the optical receiver are connected by a transformation logic circuit configured to generate the output spatiotemporal pattern based on analog logic of the transformation logic circuit operating on the input spatiotemporal pattern, and wherein the analog logic of the transformation logic circuit is configured to perform one or more of add to, subtract from, multiple, divide, perform matrix operations, or remap in 2 or 3 dimensions some or all of the input spatiotemporal pattern.

12. The optical repeater of claim 11, wherein the analog logic is hardcoded into hardware of the transformation logic circuit.

13. An optical communication system, comprising:

an optical transmission medium for transmitting optical signals from a transmission device through a first portion of the optical transmission medium to a reception device through a second portion of the optical transmission medium; and an optical repeater positioned on a transmission path of the optical signals between the first portion and the second portion of the optical transmission medium, the optical repeater including:

an optical receiver coupled to the first portion and configured to detect an input spatiotemporal pattern transmitted from the transmission device, the input spatiotemporal pattern comprising a plurality of input cells arranged at different spatial locations in a transverse cross-section of the optical transmission medium;

an optical transmitter coupled to the second portion and configured to transmit an output spatiotemporal pattern to the reception device, the output spatiotemporal pattern comprising a plurality of output cells arranged at different spatial locations in a transverse cross-section of the optical transmission medium; and a repeater circuit electronically connecting the optical receiver and the optical transmitter and configured to generate the output spatiotemporal pattern based at least in part on the input spatiotemporal pattern.

14. The optical communication system of claim 13, wherein the plurality of input cells of the input spatiotemporal pattern is different from the plurality of output cells of the output spatiotemporal pattern.

15. The optical communication system of claim 13, wherein the repeater circuit is configured to perform one or more transformations on the input spatiotemporal pattern to generate the output spatiotemporal pattern, and wherein the one or more transformations include one or more of adding to, subtracting from, multiplying, dividing, performing matrix operations on, or 2- or 3-dimensional remapping of one or more cells of the input spatiotemporal pattern.

16. The optical communication system of claim 15, wherein the repeater circuit is an analog circuit and does not include any processing components.

17. A method of communicating spatiotemporal patterns, comprising:

receiving, with an optical receiver, an input spatiotemporal pattern transmitted from a transmission device through an optical transmission medium, the input spatiotemporal pattern comprising a plurality of input cells arranged at different spatial locations in a transverse cross-section of the optical transmission medium;

detecting, with the optical receiver, the input spatiotemporal pattern with a plurality of input cells with a plurality of light receptors arranged at spatial locations across the transverse cross-section of the optical transmission medium corresponding to the different spatial locations of the plurality of input cells of the input spatiotemporal pattern;

generating, with an optical transmitter, an output spatiotemporal pattern based at least in part on the input spatiotemporal pattern by driving a plurality of light emitters arranged at spatial locations across the transverse cross-section of the optical transmission medium to generate a plurality of output cells arranged at different spatial locations in the transverse cross-section of the optical transmission medium; and transmitting the output spatiotemporal pattern from the optical transmitter to a reception device through the optical transmission medium.

18. The method of claim 17, further comprising driving the plurality of light emitters without any processing components and with an analog circuit connecting the plurality of light receptors to the plurality of light emitters.

19. The method of claim 17, further comprising encoding a first data set into the plurality of input cells arranged at different spatial locations of the input spatiotemporal pattern based on Transverse Anderson Localization of light for transmitting the input spatiotemporal pattern through a Transverse Anderson Localization Optical Fiber (TALOF) and transmitting the first data set via plurality of input cells arranged at the different spatial locations of the input spatiotemporal pattern with the transmission device.

20. The method of claim 19, further comprising receiving the output spatiotemporal pattern as the plurality a output cells arranged at the different spatial locations of the output spatiotemporal pattern based on Transverse Anderson Localization of light transmitted through the TALOF, and further comprising decoding a second data set from plurality of output cells arranged at the different spatial locations the output spatiotemporal pattern.

* * * * *